United States Patent
Yan et al.

(10) Patent No.: US 11,363,575 B2
(45) Date of Patent: Jun. 14, 2022

(54) UPLINK INFORMATION SENDING METHOD AND APPARATUS AND UPLINK INFORMATION RECEIVING METHOD AND APPARATUS

(71) Applicant: Huawei Technologies Co., Ltd., Shenzhen (CN)

(72) Inventors: Zhiyu Yan, Shenzhen (CN); Yongxia Lyu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 307 days.

(21) Appl. No.: 16/599,287

(22) Filed: Oct. 11, 2019

(65) Prior Publication Data

US 2020/0045694 A1 Feb. 6, 2020

Related U.S. Application Data

(63) Continuation of application No. PCT/CN2018/082375, filed on Apr. 9, 2018.

(30) Foreign Application Priority Data

Apr. 13, 2017 (CN) .......................... 201710241640.5

(51) Int. Cl.
*H04W 72/04* (2009.01)
*H04W 72/02* (2009.01)

(52) U.S. Cl.
CPC ....... *H04W 72/0413* (2013.01); *H04W 72/02* (2013.01); *H04W 72/0446* (2013.01); *H04W 72/0493* (2013.01)

(58) Field of Classification Search
CPC ............. H04W 72/0413; H04W 72/02; H04W 72/0446; H04W 72/0493
(Continued)

(56) References Cited

U.S. PATENT DOCUMENTS

| 9,439,190 B2 | 9/2016 | Yu et al. |
| 2012/0213143 A1 | 8/2012 | Zhang et al. |

(Continued)

FOREIGN PATENT DOCUMENTS

| CN | 103493421 A | 1/2014 |
| CN | 106255215 A | 12/2016 |

(Continued)

OTHER PUBLICATIONS

Intel Corp., "Uplink Multiplexing of eMBB and URLLC Transmissions", 3GPP Draft; RI-1700377, Spokane, USA, 8 pages.
(Continued)

*Primary Examiner* — Chi Tang P Cheng
(74) *Attorney, Agent, or Firm* — Slater Matsil, LLP

(57) ABSTRACT

In an uplink information receiving method, a first terminal device receives first indication information sent by a network device, where the first indication information indicates a first uplink resource; and the first terminal device sends uplink information to the network device on a fourth uplink resource, where the fourth uplink resource is a resource other than a second uplink resource in the first uplink resource, the second uplink resource is a subset of a third uplink resource, and the third uplink resource is an intersection between a fifth uplink resource configured for a second terminal device and the first uplink resource.

12 Claims, 13 Drawing Sheets

(58) Field of Classification Search
USPC .......................................................... 370/329
See application file for complete search history.

(56) References Cited

U.S. PATENT DOCUMENTS

| 2015/0334685 | A1  | 11/2015 | Ji et al. |            |
|--------------|-----|---------|-----------|------------|
| 2018/0124687 | A1* | 5/2018  | Park      | H04L 5/1469 |
| 2019/0075561 | A1* | 3/2019  | Tang      | H04W 72/0446 |
| 2021/0289539 | A1* | 9/2021  | Byun      | H04L 1/0003 |

FOREIGN PATENT DOCUMENTS

| CN | 106301738 A | 1/2017 |
|----|-------------|--------|
| CN | 106385709 A | 2/2017 |

OTHER PUBLICATIONS

Intel Corp., "Uplink URLLC Transmission without Grant", 3GPP Draft; R1-1701206, XP051222250, Jan. 18, 2017, Spokane, USA, 10 pages.

Intel Corporation, "eMBB / URLLC Multiplexing for UL", 3GPP TSG RAN1 WG Meeting # 88bis R1-1704764, Mar. 25, 2017 (Mar. 25, 2017), total 6 pages.

\* cited by examiner

A network device detects, in the GAP time, an RS sent by URLLC UE to determine whether the URLLC UE sends UL grant free uplink information, and sends a detection result to the first UE by using second indication information.
The first UE subsequently receives and processes the second indication information within a time.

UPLINK INFORMATION SENDING METHOD AND APPARATUS AND UPLINK INFORMATION RECEIVING METHOD AND APPARATUS

CROSS-REFERENCE TO RELATED APPLICATIONS

This application is a continuation of International Application No. PCT/CN2018/082375, filed on Apr. 9, 2018, which claims priority to Chinese Patent Application No. 201710241640.5, filed on Apr. 13, 2017. The disclosures of the aforementioned applications are hereby incorporated by reference in their entireties.

TECHNICAL FIELD

Embodiments of the present invention relate to the communication field, and more specifically, to an uplink information sending method and apparatus and an uplink information receiving method and apparatus.

BACKGROUND

In a long term evolution (LTE) wireless communication system, transmission of uplink data is scheduling-based. Scheduling mainly includes a dynamic scheduling manner and a semi-static scheduling manner. In the dynamic scheduling manner, when a terminal device needs to send uplink data, the terminal device first sends a scheduling request to a network device. After receiving the scheduling request, the network device allocates, to the terminal device, a resource used to send the uplink data, and sends information about the resource to the terminal device by using control signaling. The terminal device sends the uplink data on the resource allocated by the network device. In the semi-static scheduling manner, the network device does not need to indicate, to the terminal device, the resource for uplink transmission each time uplink transmission is performed, but uses a "once allocated, used for a plurality of times" manner.

A 5th generation (5G) communication system covers three types of scenarios, including enhanced mobile broadband (eeMBB), massive machine type communication (mMTC), and ultra-reliable and low latency communications (URLLC). Based on an existing mobile broadband service scenario, an eMBB service is further used to improve performance such as user experience. For example, the eMBB may be applied to a traffic intensive mobile broadband service such as a three-dimensional (3D) video or an ultra-high definition video. The mMTC may be applied to a large-scale internet of things service. The URLLC may be applied to a service that requires an ultra-reliable and low latency connection, such as self-driving or industrial automation.

A URLLC service has two basic requirements. One is a relatively high latency requirement. For example, both an uplink user plane latency and a downlink user plane latency that are currently specified cannot exceed 0.5 ms. The other is a relatively high reliability requirement. For example, a bit error rate within 1 ms cannot exceed 0.001%.

During uplink grant-free (UL grant free) data transmission (or referred to as uplink scheduling-free (UL scheduled free) data transmission), reliability and low-latency requirements of a URLLC technology for data transmission can be effectively met. Before the uplink grant-free data transmission, in other words, a terminal device sends uplink data, a network device does not need to send uplink scheduling grant signaling to the terminal device, but directly sends the uplink data on a resource configured for the terminal device. Therefore, the terminal device sends the uplink data by using a UL grant free technology without depending on a dynamic notification from the network device, and the network device sends preconfiguration information to the terminal device to configure a UL grant free resource for the terminal device, to send the uplink data. In this case, the terminal device does not need to first send, when sending the uplink data, a scheduling request to the network device to request an uplink resource. Therefore, the UL grant free technology may be used to save time in which the terminal device sends an uplink scheduling request to the network device, the network device sends scheduling information to the terminal device after receiving the uplink scheduling request, and the like.

When the terminal device sends the uplink data by using the UL grant free technology, the network device does not know specific terminal devices that have a requirement for sending the uplink data in a time period, and does not know an amount of uplink data that needs to be sent by a terminal device. If time division multiplexing is performed on a resource of an eMBB service and a resource of a URLLC service, a latency of the URLLC service is relatively high. If frequency division multiplexing is performed on a resource of an eMBB service and a resource of a URLLC service, when there is no URLLC service, a frequency band allocated to the URLLC service cannot be used for data transmission of the eMBB service, thereby resulting in low resource utilization efficiency.

For an uplink service, another burst URLLC uplink service may exist on an uplink resource that has been allocated by the network device to eMBB UE and that is used to send data. If a UL grant free uplink resource configured for another UE completely or partially overlaps with a UE resource on which the eMBB service is transmitted, an eMBB uplink service that is being transmitted collides with a URLLC uplink service that is being transmitted. Consequently, both the eMBB uplink service and the URLLC uplink service are affected.

SUMMARY

Embodiments of the present invention provide a data sending method and apparatus and a data receiving method and apparatus, to provide a data scheduling scheme that can be applied to a high frequency scenario.

According to a first aspect, an uplink information sending method is provided, and includes:

receiving, by a first terminal device, first indication information sent by a network device, where the first indication information indicates a first uplink resource; and sending, by the first terminal device, uplink information to the network device on a fourth uplink resource, where the fourth uplink resource is a resource other than a second uplink resource in the first uplink resource, the second uplink resource is a subset of a third uplink resource, and the third uplink resource is an intersection between a fifth uplink resource configured for a second terminal device and the first uplink resource.

According to a second aspect, an uplink information receiving method is provided, and includes:

sending, by a network device, first indication information to a first terminal device, where the first indication information indicates a first uplink resource; and receiving, by the network device, on a fourth uplink resource, uplink information sent by the first terminal device, where the fourth uplink resource is a resource other than a second uplink resource in the first uplink resource, the second uplink resource is a subset of a third uplink resource, and the third uplink resource is an intersection between a fifth uplink resource configured for a second terminal device and the first uplink resource.

In this embodiment of the present invention, when there is the intersection between the first uplink resource allocated to the first terminal device and the fifth uplink resource allocated to the second terminal device, in the foregoing method, the first terminal device may use the fifth uplink resource allocated to the second terminal device, so that the first terminal device and the second terminal device can dynamically multiplex an uplink resource, to improve resource utilization of the fifth uplink resource, and ensure transmission performance of each of the first terminal device and the second terminal device.

For example, the first terminal device is eMBB UE, and the second terminal device is URLLC UE. In the foregoing solution, the eMBB UE and the URLLC UE dynamically multiplex the uplink resource, to resolve a problem that quality of service of a service degrades due to a conflict between a resource of an eMBB uplink service and a resource of an URLLC uplink service, and ensure utilization efficiency of the uplink resource and transmission performance of each of the two services.

Optionally, the first uplink resource may include a plurality of fifth uplink resources. The first terminal device performs the foregoing method on each fifth uplink resource included in the first uplink resource.

The fifth uplink resource may include a plurality of first symbols, and the first uplink resource may include a plurality of second symbols. A length of the first symbol may be the same as or different from a length of the second symbol.

Optionally, the second uplink resource includes a resource that is in the third uplink resource and that is used by the second terminal device to send some or all first signals; or the fifth uplink resource further includes a resource that is before the third uplink resource and that is used by the second terminal device to send some or all first signals.

In this optional implementation, when sending the uplink information, the first terminal device can bypass a resource that is in the fifth uplink resource and that is used to send the first signal, so that it can be ensured that the first signal is not interfered with by the uplink information sent by the first terminal device, and reliability of detecting the first signal by the network device is improved.

Some or all the first signals are sent on the first n symbols in the fifth uplink resource, where n is an integer greater than or equal to 1. It can be learned that if the first uplink resource includes the fifth uplink resource, the second uplink resource further includes the first n symbols in the fifth uplink resource. In some cases, the first uplink resource may not include the first n symbols in the fifth uplink resource. In this manner, it can be ensured that the first terminal device learns, as soon as possible, whether a resource after a first time period in the fifth uplink resource can be used.

Optionally, some or all the first signals are on some frequency domain resources in the first n symbols.

In this case, a remaining frequency domain resource other than the frequency domain resources in the first n symbols is not occupied by the first signal. The remaining frequency domain resource is used by the first terminal device to send the uplink information. In other words, the remaining frequency domain resource is included in the fourth uplink resource. Alternatively, the remaining frequency domain resource is used by the second terminal device to send the uplink information. In this case, the remaining frequency domain resource is included in the second uplink resource.

Further, the frequency domain resources are distributed in the first n symbols in a comb-like manner.

If all resources in some symbols in the fifth uplink resource are used to send the first signal, transmission efficiency of the fifth uplink resource is very low. In this way, some or all the first signals are sent on the frequency domain resources in the first n symbols, to improve transmission efficiency of the fifth uplink resource.

Optionally, the second uplink resource includes a resource corresponding to a first time period.

In this case, in an optional implementation, after the first terminal device receives the first indication information sent by the network device, the first terminal device receives, in the first time period, second indication information sent by the network device. Correspondingly, the network device sends the second indication information to the first terminal device in the first time period. The second indication information indicates that a resource after the first time period in the third uplink resource is unavailable, and the second uplink resource further includes the resource after the first time period in the third uplink resource.

Optionally, after the first terminal device receives the first indication information sent by the network device, the first terminal device receives, in the first time period, the second indication information sent by the network device. Correspondingly, the network device sends the second indication information to the first terminal device in the first time period. The second indication information indicates that the resource after the first time period in the third uplink resource is available, the fourth uplink resource includes the resource after the first time period in the third uplink resource, and the second uplink resource does not include the resource after the first time period in the third uplink resource.

In this optional implementation, the first terminal device does not occupy a resource in the first time period after a resource on which the second terminal device sends the first signal. To be specific, the first terminal device does not send the uplink information on the resource in the first time period. In addition, the network device sends the second indication information to the first terminal device in the first time period. In this way, reliability of sending the uplink information by the second terminal device in the first time period can also be enhanced. In addition, the network device detects the first signal, so that reliability of detecting the first signal can be improved, and missed detection of the first signal can be avoided to some extent, thereby further ensuring reliability of sending the uplink information by the second terminal device on the fifth uplink resource.

Therefore, in the foregoing solution, the first terminal device does not occupy, on a scheduled first uplink resource, a resource on which the second terminal device sends the first signal, and does not occupy a resource that is in the first time period in the fifth uplink resource and that is adjacent to the resource on which the first signal is sent. In addition, the first terminal device does not occupy, according to the second indication information, a resource that has been occupied when the second terminal device sends the uplink information, to reduce interference in sending the uplink information by the second terminal device, and improve reliability of sending the uplink information by the second terminal device.

In another optional implementation, after the receiving, by a first terminal device, first indication information sent by a network device, the method further includes: performing, by the first terminal device in the first time period, detection on a first signal sent by the second terminal device. If the first terminal device detects the first signal, the second uplink resource further includes a resource after the first time period in the third uplink resource; and/or if the first terminal device does not detect the first signal, the fourth uplink resource includes the resource after the first time period in the third uplink resource, and the second uplink resource does not include the resource after the first time period in the third uplink resource.

In this optional implementation, the first terminal device does not occupy a resource in the first time period after a resource on which the second terminal device sends the first signal. To be specific, the first terminal device does not send the uplink information on the resource in the first time period. The first terminal device detects, in the first time period, first information sent by the second terminal device, so that reliability of detecting the first signal can be improved. In this manner, the network device does not need to send the second indication information, so that signaling overheads can be reduced.

Optionally, the fourth uplink resource includes a resource corresponding to a first time period in the third uplink resource.

Further, optionally, after the first terminal device receives the first indication information, the first terminal device receives, in the first time period, the second indication information sent by the network device. Correspondingly, the network device sends the second indication information to the first terminal device in the first time period. The second indication information indicates that a resource after the first time period in the third uplink resource is unavailable, and the second uplink resource further includes the resource after the first time period in the third uplink resource.

Optionally, after the first terminal device receives the first indication information, the first terminal device receives, in the first time period, the second indication information sent by the network device. Correspondingly, the network device sends the second indication information to the first terminal device in the first time period. The second indication information indicates that the resource after the first time period in the third uplink resource is available, the fourth uplink resource further includes the resource after the first time period in the third uplink resource, and the second uplink resource does not include the resource after the first time period in the third uplink resource.

In the foregoing optional implementation, the second uplink resource includes a resource that is in the third uplink resource and that is used by the second terminal device to send some or all first signals, some or all the first signals are sent on the first n time domain symbols in the third uplink resource, and the resource corresponding to the first time period is one or more symbols starting from an $(n+1)^{th}$ symbol. The one or more symbols described herein is/are a symbol or symbols in the fifth uplink resource.

Optionally, before the first terminal device sends the uplink information, the first terminal device receives configuration information from the network device. Correspondingly, the network device sends the configuration information to the first terminal device. The configuration information is used to indicate the fifth uplink resource. In this way, the first terminal device can determine the fifth uplink resource based on the configuration information, to determine whether a part of the fifth uplink resource can be used by the first terminal device to send the uplink information.

According to a third aspect, an uplink information sending method is provided, and includes: receiving, by a second terminal device from a network device, configuration information indicating an uplink resource configured for the second terminal device, where the uplink resource includes a plurality of time domain symbols; sending, by the second terminal device, a first signal on the first n time domain symbols in the plurality of time domain symbols; and sending, by the second terminal device, uplink information on an $(n+k)^{th}$ symbol to a last symbol in the plurality of time domain symbols, where k is an integer greater than or equal to 1; the first signal is used to identify the second terminal device, or the first signal is used to perform channel estimation on the uplink information, or the first signal is used to indicate uplink sending timing adjustment of the second terminal device, or the first signal is used to instruct the second terminal device to occupy the uplink resource, or the first signal is used to instruct the second terminal device to send control information of the uplink information; and the control information includes at least one of a modulation and coding scheme, a hybrid automatic repeat request HARQ process number, a redundancy version (RV), or a new data indicator (NDI).

In this embodiment, if a first terminal device needs to send uplink information, the second terminal device sends the first signal on the first n symbols in the configured fifth uplink resource, so that the network device and/or the first terminal device can identify that the second terminal device needs to send the uplink information on the fifth uplink resource, to avoid a collision between the uplink information sent by the second terminal device and the uplink information sent by the first terminal device.

Further, when k is greater than 1, the second terminal device does not send the uplink information on an $(n+1)^{th}$ symbol to an $(n+k)^{th}$ symbol in the configured fifth uplink resource. In this case, the first terminal device can send the uplink information on a resource that is in a first uplink resource and that corresponds to the $(n+1)^{th}$ symbol to the $(n+k)^{th}$ symbol.

Optionally, in the foregoing aspects, the fifth uplink resource is a resource configured for the second terminal device to send uplink scheduling-free data.

Optionally, in the foregoing aspects, the first signal is used to identify the second terminal device, and the first signal is used to instruct the second terminal device to send uplink information on the fifth uplink resource.

According to a fourth aspect, a network device is provided, and is configured to perform the method of the network device. Specifically, the network device may include a module configured to perform a corresponding step of the network device, for example, a processing module, a sending module, and a receiving module.

According to a fifth aspect, a terminal device is provided, and is configured to perform the method of the first terminal device or the second terminal device. Specifically, the first terminal device or the second terminal device may include a module configured to perform a corresponding step of the first terminal device or the second terminal device, for example, a processing module, a sending module, and a receiving module.

According to a sixth aspect, a network device is provided, and includes a memory and a processor. The memory is configured to store a computer program, and the processor is configured to invoke the computer program from the memory and run the computer program, so that the network device performs the method of the network device.

According to a seventh aspect, a terminal device is provided, and includes a memory and a processor. The memory is configured to store a computer program, and the processor is configured to invoke the computer program from the memory and run the computer program, so that the terminal device performs the method of the first terminal device or the second terminal device.

According to an eighth aspect, a computer readable storage medium is provided, and the computer readable storage medium stores an instruction. When running on a computer, the instruction enables the computer to perform the methods in the foregoing aspects.

According to a ninth aspect, a computer program product including an instruction is provided. When running on a computer, the computer program product enables the computer to perform the methods in the foregoing aspects.

DETAILED DESCRIPTION OF ILLUSTRATIVE EMBODIMENTS

Figure 1:
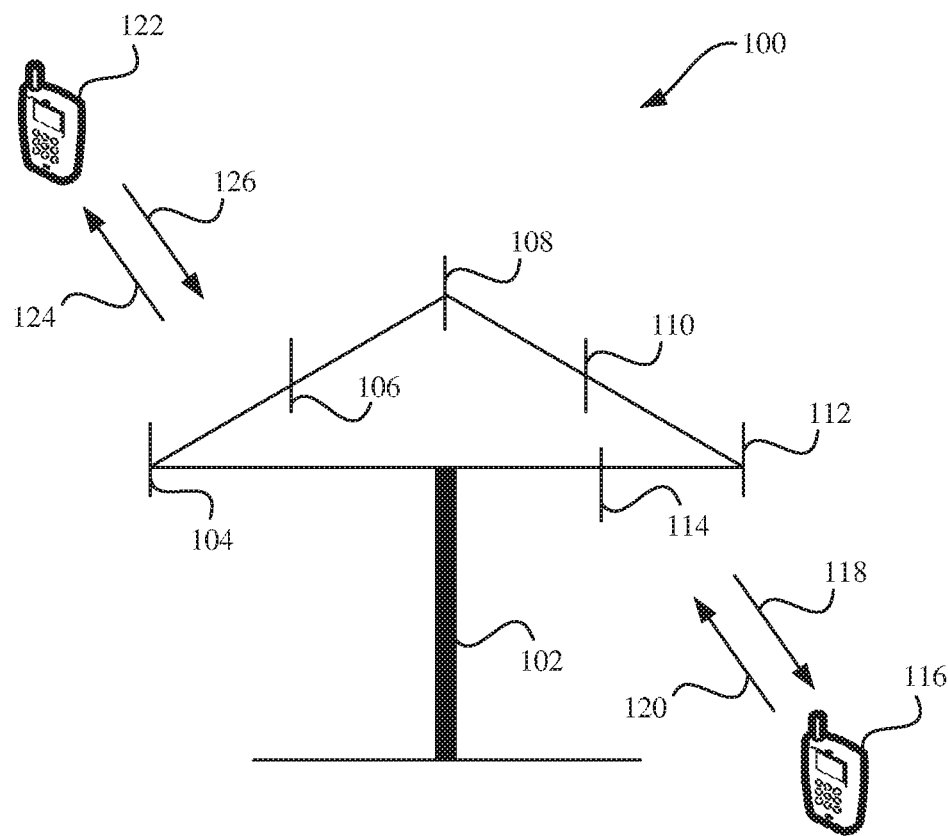
FIG. 1 is a schematic diagram of a wireless communication system applied to an embodiment of the present invention.

It should be understood that the embodiments of the present invention may be applied to various communication systems, for example, a global system for mobile communications (GSM), a code division multiple access (CDMA) system, a wideband code division multiple access (WCDMA) system, a general packet radio service (GPRS) system, a long term evolution (LTE) system, a long term evolution-advanced (LTE-A) system, a universal mobile telecommunication system (UMTS), or a next-generation communication system, for example, a 5G system.

Usually, a quantity of connections supported by a conventional communication system is limited and easy to be implemented. However, with development of communication technologies, in addition to conventional communication, a mobile communication system supports, for example, device-to-device (D2D) communication, machine-to-machine (M2M) communication, machine type communication (MTC), and vehicle-to-vehicle (V2V) communication.

The embodiments are described with reference to a sending device and a receiving device in the embodiments of the present invention. The sending device may be one of a network device and a terminal device, and the receiving device may be the other one of the network device and the terminal device. For example, in the embodiments of the present invention, the sending device may be the network device, and the receiving device may be the terminal device. Alternatively, the sending device may be the terminal device, and the receiving device may be the network device.

The terminal device may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device may be a station (STA) in a wireless local area network (WLAN), or may be a cellular phone, a cordless phone, a session initiation protocol (SIP) phone, a wireless local loop (WLL) station, a personal digital assistant (PDA) device, a handheld device with a wireless communication function, a computing device or another processing device connected to a wireless modem, a vehicle-mounted device, a wearable device, and a next-generation communication system, for example, a terminal device in a 5th generation (5G) communication network or a terminal device in a future evolved public land mobile network (PLMN) network. An example in which UE is the terminal device is used below for description. It should be noted that the UE in the embodiments of the present invention may also be another type of terminal device.

In an example, in the embodiments of the present invention, the terminal device may alternatively be a wearable device. The wearable device may also be referred to as a wearable intelligent device, and is a generic term for wearable devices such as glasses, gloves, a watch, clothes, and shoes that are developed by applying wearable technologies in intelligent designs of daily wear. The wearable device is a portable device that is directly worn on an entity or integrated into clothes or an accessory of a user. The wearable device is not merely a hardware device, but implements a powerful function through software support, data exchange, and cloud interaction. In a broad sense, the wearable intelligent device includes a full-featured and large-sized device that can implement complete or partial functions without depending on a smartphone, for example, a smartwatch or smart glasses, and a device that focuses on only one type of application function and needs to work with another device such as a smartphone, for example, various smart bands or smart jewelry for monitoring physical signs.

The network device may be a device configured to communicate with a mobile device. The network device may be an access point (AP) in a WLAN, or a base transceiver station (BTS) in GSM or CDMA, or may be a NodeB (NB) in WCDMA, or may be an evolved NodeB (eNB or eNodeB) in LTE, or a relay node or an access point, or a vehicle-mounted device, a wearable device, a network device (for example, a gNodeB (gNB)) in a 5G network, a network device in a future evolved PLMN network, or the like.

In addition, in the embodiments of the present invention, the network device provides a service for a cell, and the terminal device communicates with the network device by using a transmission resource (for example, a frequency domain resource or a spectrum resource) used in the cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, and the like. These small cells are characterized by a small coverage area and low transmit power, and are applicable to providing a high-rate data transmission service.

A method and an apparatus provided in the embodiments of the present invention may be applied to a terminal device or a network device. The terminal device or the network device includes a hardware layer, an operating system layer running on the hardware layer, and an application layer running on the operating system layer. The hardware layer includes hardware such as a central processing unit (CPU), a memory management unit (MMU), and memory (also referred to as main memory). An operating system may be any one or more computer operating systems implementing service processing by using a process, for example, a Linux operating system, a Unix operating system, an Android operating system, an iOS operating system, or a Windows operating system. The application layer includes an application such as a browser, an address book, word processing software, and instant messaging software. In addition, in the embodiments of the present invention, a specific structure of an execution entity of a signal transmission method is not specifically limited in the embodiments of the present invention, provided that communication can be performed based on the signal transmission method in the embodiments of the present invention by running a program that records code in the signal transmission method in the embodiments of the present invention. For example, a wireless communication method in the embodiments of the present invention may be performed by a terminal device or a network device, or a function module that is in the terminal device or the network device and that can invoke and execute a program.

In addition, aspects or features in the embodiments of the present invention may be implemented as a method, an apparatus or a product that uses standard programming and/or engineering technologies. The term "product" used in this application covers a computer program that can be accessed from any computer readable device, carrier, or medium. For example, the computer readable medium may include but is not limited to a magnetic storage device (for example, a hard disk, a floppy disk, or a magnetic tape), an optical disc (for example, a compact disc (CD) or a digital versatile disc (DVD)), a smart card, and a flash memory device (for example, an erasable programmable read-only memory (EPROM), a card, a stick, or a key drive). In addition, various storage media described in this specification may represent one or more devices and/or other machine readable media that are configured to store information. The term "machine readable media" may include but is not limited to a radio channel and various other media that can store, include, and/or carry an instruction and/or data.

FIG. 1 is a schematic diagram of a wireless communication system applied to an embodiment of the present invention. As shown in FIG. 1, the wireless communication system 100 includes a network device 102, and the network device 102 may include one or more antennas, for example, antennas 104, 106, 108, 110, 112, and 114. In addition, the network device 102 may additionally include a transmitter chain and a receiver chain. A person of ordinary skill in the art may understand that the transmitter chain and the receiver chain may each include a plurality of components (for example, a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it may be understood that the network device 102 may communicate with any quantity of terminal devices similar to the terminal device 116 or the terminal device 122. For example, the terminal devices 116 and 122 may be a cellular phone, a smartphone, a portable computer, a handheld communication device, a handheld computing device, a satellite radio apparatus, a global positioning system, a PDA, and/or any other proper device configured to perform communication in the wireless communication system 100. The plurality of terminal devices may perform different services. For example, the terminal device 116 may be a terminal device that performs an eMBB service in this embodiment of the present invention, and the terminal device 122 may be a terminal device that performs a URLLC service in this embodiment of the present invention.

As shown in FIG. 1, the terminal device 116 communicates with the antennas 112 and 114. The antennas 112 and 114 send information to the terminal device 116 by using a forward link (also referred to as a downlink) 118, and receive information from the terminal device 116 by using a reverse link (also referred to as an uplink) 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 and the reverse link 120 may use different frequency bands, and the forward link 124 and the reverse link 126 may use different frequency bands.

For another example, in a time division duplex (TDD) system, a full duplex system, and a flexible duplex system, the forward link 118 and the reverse link 120 may use a same frequency band, and the forward link 124 and the reverse link 126 may use a same frequency band.

Each antenna (or an antenna group including a plurality of antennas) and/or an area designed for communication are/is referred to as a sector of the network device 102. For example, the antenna group may be designed to communicate with a terminal device in a sector in a coverage area of the network device 102. The network device may send, by using a single antenna or a multi-antenna transmit diversity, a signal to all terminal devices in a sector corresponding to the network device. In a process in which the network device 102 separately communicates with the terminal devices 116 and 122 by using the forward links 118 and 124, a transmit antenna of the network device 102 may also improve signal-to-noise ratios of the forward links 118 and 124 through beamforming. In addition, compared with a manner in which the network device sends the signal to all the terminal devices of the network device by using the single antenna or the multi-antenna transmit diversity, in this manner, less interference is caused to a mobile device in a neighboring cell when the network device 102 sends, through beamforming, a signal to the terminal devices 116 and 122 randomly distributed in a related coverage area.

At a given time, the network device 102, the terminal device 116, or the terminal device 122 may be a wireless communication sending apparatus and/or a wireless communication receiving apparatus. When sending data, the wireless communication sending apparatus may encode the data for transmission. Specifically, the wireless communication sending apparatus may obtain (for example, generate, receive from another communication apparatus, or store in a memory) a specific quantity of data bits that need to be sent to the wireless communication receiving apparatus through a channel. The data bits may be included in a transport block (or a plurality of transport blocks) of data, and the transport block may be segmented to generate a plurality of code blocks.

In addition, the communication system 100 may be a PLMN network, a D2D network, an M2M network, or another network. FIG. 1 is merely a simplified schematic diagram of an example. The network may further include another network device that is not shown in FIG. 1.

Figure 2:
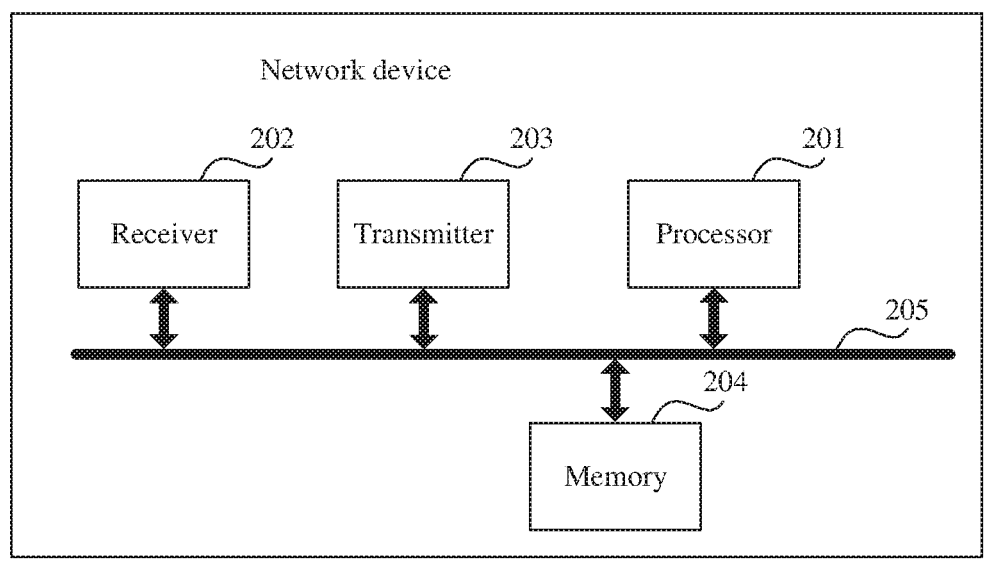
FIG. 2 is a schematic structural diagram of a network device in the foregoing wireless communication system.

FIG. 2 is a schematic structural diagram of a network device in the foregoing wireless communication system. The network device can perform a data sending method provided in this embodiment of the present invention. The network device includes a processor 201, a receiver 202, a transmitter 203, and a memory 204. The processor 201 may be communicatively connected to the receiver 202 and the transmitter 203. The memory 204 may be configured to store program code and data that are of the network device. Therefore, the memory 204 may be a storage unit in the processor 201, or an external storage unit independent of the processor 201, or a component including the storage unit in the processor 201 and the external storage unit independent of the processor 201.

Optionally, the network device may further include a bus 205. The receiver 202, the transmitter 203, and the memory 204 may be connected to the processor 201 by using the bus 205. The bus 205 may be a peripheral component interconnect (PCI) bus, an extended industry standard architecture (EISA) bus, or the like. The bus 205 may be classified into an address bus, a data bus, a control bus, and the like. For ease of representation, only one thick line is used to represent the bus 205 in FIG. 2, but this does not mean that there is only one bus or only one type of bus.

For example, the processor 201 may be a central processing unit (CPU), a general purpose processor, a digital signal processor (DSP), an application-specific integrated circuit (ASIC), a field programmable gate array (FPGA), or another programmable logical device, a transistor logical device, a hardware component, or any combination thereof. The processor 201 may implement or execute various example logical blocks, modules, and circuits described with reference to content disclosed in the embodiments of the present invention. Alternatively, the processor may be a combination of devices implementing a computing function, for example, a combination of one or more microprocessors, a combination of a DSP and a microprocessor, or a system-on-a-chip (SOC).

The receiver 202 and the transmitter 203 may be a circuit including the antenna, the transmitter chain, and the receiver chain, and may be independent circuits or a same circuit (for example, a transceiver).

Figure 3:
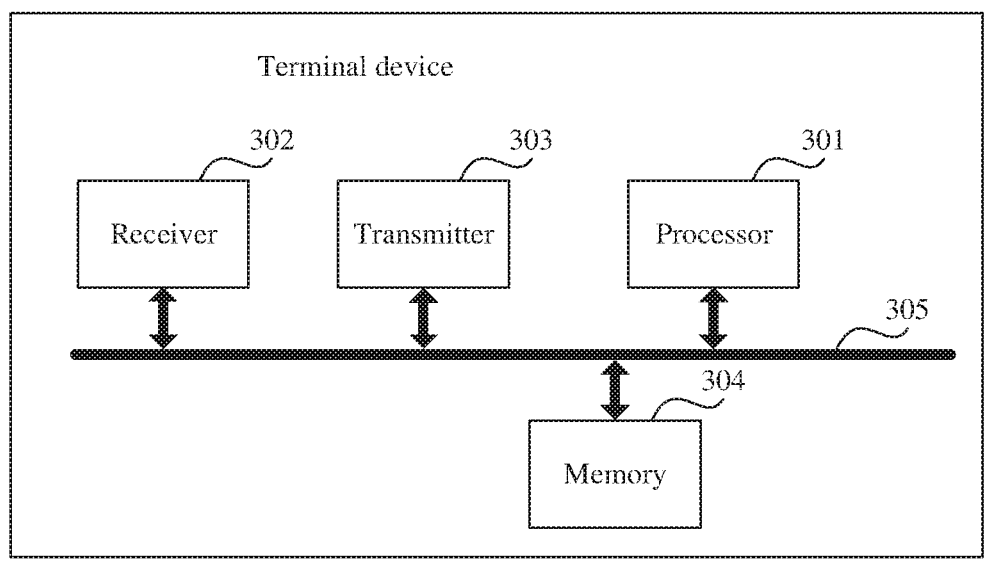
FIG. 3 is a schematic structural diagram of a terminal device in the foregoing wireless communication system.

FIG. 3 is a schematic structural diagram of a terminal device in the foregoing wireless communication system. The terminal device can perform a data receiving method provided in this embodiment of the present invention. The terminal device may include a processor 301, a receiver 302, a transmitter 303, and a memory 304. Optionally, the processor 301 may be communicatively connected to the receiver 302 and the transmitter 303. Alternatively, the terminal device may further include a bus 305. The receiver 302, the transmitter 303, and the memory 304 may be connected to the processor 301 by using the bus 305. The bus 305 may be a peripheral component interconnect (PCI) bus, an extended industry standard architecture (EISA) bus, or the like. The bus 305 may be classified into an address bus, a data bus, a control bus, and the like. For ease of representation, only one thick line is used to represent the bus 305 in FIG. 3, but this does not mean that there is only one bus or only one type of bus.

Correspondingly, the memory 304 may be configured to store program code and data that are of the terminal device. Therefore, the memory 304 may be a storage unit in the processor 301, an external storage unit independent of the processor 301, or a component including the storage unit in the processor 301 and the external storage unit independent of the processor 301. The receiver 302 and the transmitter 303 may be independent circuits or a same circuit (for example, a transceiver).

A new radio (NR) system can support a plurality of subcarrier spacings to adapt to different service requirements. In frequency domain, a type of a supported subcarrier spacing meets $fsc=fo*2m$, where $fo=15$ kilohertz (kHz), and m is an integer. In time domain, several time units, namely, a subframe, a slot (Slot), and a mini-slot are defined in the NR system.

Subframe: A length of one subframe is 1 ms. For different subcarrier spacings, one subframe includes different quantities of orthogonal frequency division multiplexing (OFDM) symbols (briefly referred to as symbols or time domain symbols below). For example, when a subcarrier spacing is 15 kHz, one subframe includes 14 symbols. When a subcarrier spacing is 30 kHz, one subframe includes approximately 28 symbols. When a subcarrier spacing is 60 kHz, one subframe includes approximately 56 symbols. In one subframe, symbol boundaries at subcarrier spacings that are 15 kHz and more than 15 kHz are aligned.

The slot is a length of a possible time scheduling unit. One slot includes y symbols. A length of each symbol corresponds to a subcarrier spacing. When the subcarrier spacing is less than or equal to 60 kHz, y=7 or 14; or when the subcarrier spacing is greater than 60 kHz, y=14. For example, when the subcarrier spacing is equal to 15 kHz, one slot includes seven symbols, and a length of one slot is 0.5 ms. When the subcarrier spacing is 60 kHz, a length of one slot is shortened to 0.125 ms.

Figure 4:
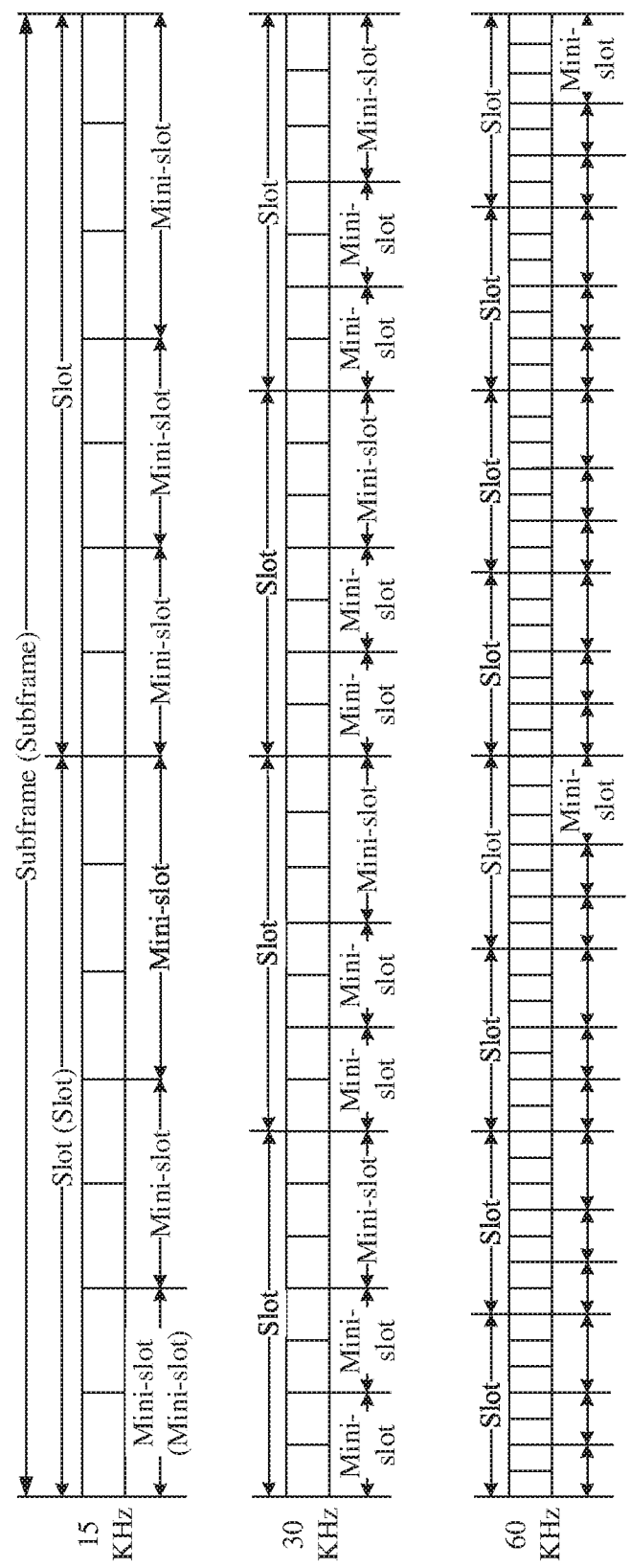
FIG. 4 is a schematic diagram of an example of a frame structure according to an embodiment of the present invention.

The mini-slot (mini-slot) may be a minimum time scheduling unit. One mini-slot includes one or more symbols. FIG. 4 is a schematic diagram of an example of a frame structure according to an embodiment of the present invention. As shown in FIG. 4, when a subcarrier spacing is 15 kHz, one mini-slot may include two or three symbols. When a subcarrier spacing is 60 kHz, one mini-slot may include two or three symbols. Certainly, a quantity of symbols that may be included in one mini-slot is not limited thereto. The value herein is merely an example.

In a 4G system, a minimum time scheduling unit is a 1 ms transmission time interval (TTI). To meet a transmission latency requirement of a URLLC service, a shorter time scheduling unit may be used for data transmission on a wireless air interface. For example, a mini-slot or a slot with a relatively large subcarrier spacing is used as the minimum time scheduling unit.

Because an eMBB service has a relatively large amount of data and a relatively high transmission rate, a relatively large time scheduling unit is usually used for data transmission to improve transmission efficiency. For example, when a subcarrier spacing is 15 kHz, one slot includes seven time domain symbols, and a time length corresponding to one slot is 0.5 ms. A relatively small time scheduling unit is usually used for data of the URLLC service to meet an ultra-low latency requirement. For example, when a subcarrier spacing is 15 kHz, a mini-slot is used as a time scheduling unit. Alternatively, when a subcarrier spacing is 60 kHz, one slot includes seven time domain symbols and one slot is 0.125 ms. When a subcarrier spacing is 60 kHz, a slot is used as a time scheduling unit.

A data packet of the URLLC service is generated in bursts randomly. A data packet may not be generated in a very long period of time, or a plurality of data packets may be generated in a very short time. In most cases, the data packet of the URLLC service is a small packet, for example, has 50 bytes. A feature of the data packet of the URLLC service affects a resource allocation manner of a communication system. A resource herein includes but is not limited to a time domain symbol, a frequency domain resource, a time-frequency resource, a codeword resource, a beam resource, and the like.

Figure 5:
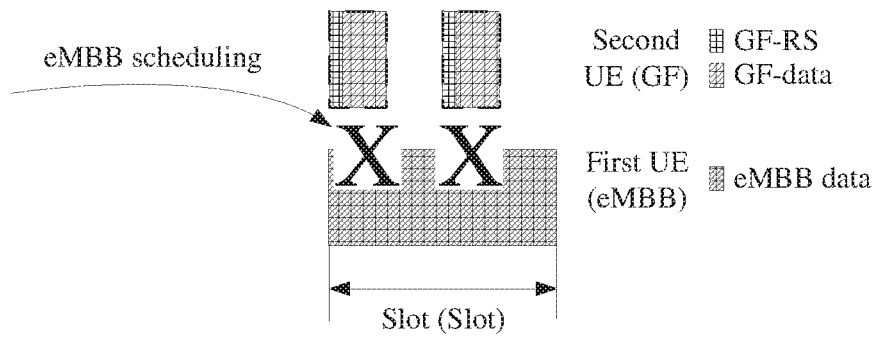
FIG. 5 is a schematic diagram of uplink resources allocated to a first terminal device and a second terminal device.

FIG. 5 is a schematic diagram of uplink resources allocated to a first terminal device and a second terminal device. As shown in FIG. 5, a network device schedules the first terminal device (first UE is used as an example below for description) to send uplink data in a slot with a subcarrier spacing of 15 kHz. In other words, the network device sends uplink scheduling signaling to the first UE. The uplink scheduling signaling indicates that an uplink resource in one slot is used by the first UE to send data.

In addition, the network device pre-configures some symbols in the slot, for example, symbols included in two mini-slots, to the second terminal device (second UE is used as an example below for description) and uses the symbols as UL grant free uplink resources. Resources in the two mini-slots are used by the second UE to send uplink data of a URLLC service. The first UE may be eMBB UE, and the second UE may be URLLC UE. In this example, before the slot, the first UE has received scheduling signaling sent by the network device (for example, a gNB), and prepares to send uplink data in the slot. If the second UE also sends uplink data in one or two mini-slots included in the slot, a resource used by the first UE to send the uplink data overlaps with a resource used by the second UE to send the uplink data. Consequently, the uplink data sent by the first UE and the uplink data sent by the second UE interfere with each other. Therefore, performance of the uplink data sent by each of the first UE and the second UE is affected, and in particular, a high reliability requirement of the uplink data of the second UE cannot be met.

If the network device classifies the uplink resource into a scheduling resource and a UL grant free resource, the scheduling resource and the UL grant free resource are orthogonal to each other, and the UL grant free resource is allocated to the URLLC service in a resource reservation manner, so that a conflict and a collision between an eMBB uplink service and a URLLC uplink service can be avoided during transmission. However, because the URLLC service is characterized by burstiness, the UL grant free uplink resource configured for the terminal device may not be used in most cases. Therefore, system resource utilization efficiency is low because the uplink resource is classified into the scheduling resource and the UL grant free resource that are orthogonal to each other. To resolve this problem, that the eMBB UE and the URLLC UE dynamically multiplex an uplink resource is proposed in this embodiment of the present invention.

In this embodiment of the present invention, the eMBB UE and the URLLC UE dynamically multiplex the uplink resource, to solve a problem that quality of service of a service degrades due to a conflict between a resource of the eMBB uplink service and a resource of the URLLC uplink service, and ensure utilization efficiency of the uplink resource and transmission performance of each of the two services.

Figure 6:
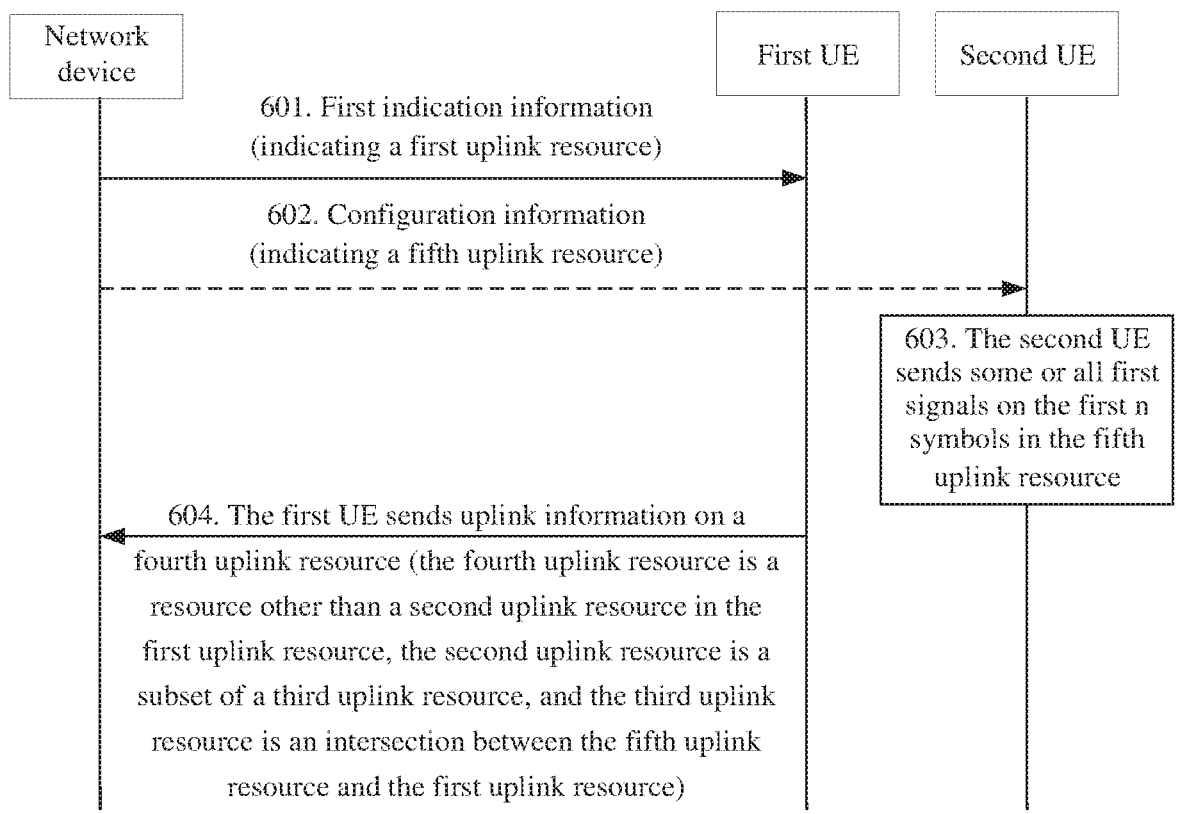
FIG. 6 is a flowchart of a method according to Embodiment 1 of the present invention.

FIG. 6 is a flowchart of a method according to Embodiment 1 of the present invention. The following steps are included in this embodiment.

Step 601: A network device sends first indication information to first UE, where the first indication information indicates a first uplink resource. Correspondingly, the first UE receives the first indication information sent by the network device.

Optionally, the first uplink resource may be a scheduled uplink resource. Alternatively, the first uplink resource may be a semi-statically configured periodic uplink resource. Alternatively, the first uplink resource may be a semi-statically configured aperiodic uplink resource.

For example, the first uplink resource may alternatively be an uplink resource in at least one slot with a subcarrier spacing of $f_1$, or may be a resource in a plurality of time domain symbols.

Correspondingly, the first indication information may be uplink scheduling grant control information, for example, control information sent by the network device by using a physical downlink control channel.

Alternatively, the first indication information may be uplink scheduling grant control information and uplink transmission resource configuration information. For example, the network device semi-statically configures uplink resources for the first UE. These uplink resources may be periodic, or these uplink resources meet a preset time pattern.

The first UE may determine, based on the first indication information, the first uplink resource that is scheduled by the network device and that is used to send uplink information.

The uplink information in this embodiment of the present invention may be uplink data and/or uplink control information.

For example, the first UE determines, based on the first indication information, that an uplink resource (the first uplink resource) allocated by the network device to the first UE is a slot #i. The slot #i may include N symbols, and N is a positive integer.

In this step, a receiver or a transceiver in the first terminal device may perform a receiving action, and a transmitter or a transceiver in the network device may perform a sending action.

Step 602: The network device sends configuration information to second UE, and the second UE receives the configuration information, where the configuration information is used to indicate a fifth uplink resource configured for the second UE.

It should be noted that step 602 is an optional step. The network device may not need to send the configuration information to the second UE. The configuration information indicating the fifth uplink resource may be preset in the second UE. Further, the configuration information indicating the fifth uplink resource may alternatively be preset in the first UE. In addition, a sequence of step 602 and step 601 is not limited in this embodiment of the present invention. In this embodiment of the present invention, step 602 may be performed before step 601. Alternatively, in this embodiment of the present invention, step 601 may be performed before step 602.

Further, the configuration information in this step may be sent by using higher layer signaling, for example, radio resource control signaling. In this case, the fifth uplink resource is a semi-statically configured resource, for example, a semi-statically configured scheduling-free or grant-free resource, namely, a resource used to send grant free data.

Optionally, the configuration information may be sent to the first UE and the second UE by using a broadcast message.

Optionally, the configuration information may be sent to the first UE and the second UE by using a UE group-specific message.

Optionally, the configuration information may alternatively be sent by using uplink scheduling grant signaling, namely, physical layer signaling. In this case, the fifth uplink resource is a dynamically configured resource.

In this step, the fifth uplink resource may include a plurality of symbols, for example, M symbols, where M is a positive integer greater than or equal to 3.

It should be noted that in this embodiment, a length of a symbol included in the fifth uplink resource may be different from a length of a symbol included in the first uplink resource. For example, a subcarrier spacing corresponding to the first uplink resource is 15 kHz, and a subcarrier spacing corresponding to the fifth uplink resource is 60 kHz. In this case, the length of the symbol included in the fifth uplink resource is less than the length of the symbol included in the first uplink resource.

Optionally, the fifth uplink resource may be a part or all of the first uplink resource. In other words, the fifth uplink resource is a subset of the first uplink resource. Alternatively, the fifth uplink resource may partially overlap with the first uplink resource. In other words, a part of the fifth uplink resource overlaps with a part or all of the first uplink resource. In this case, the fifth uplink resource intersects with the first uplink resource.

In this embodiment of the present invention, an intersection between the fifth uplink resource and the first uplink resource is a third uplink resource. When the fifth uplink resource is the subset of the first uplink resource, the third uplink resource is the same as the fifth uplink resource. Alternatively, when the fifth uplink resource partially overlaps with the first uplink resource, the third uplink resource is a part of the fifth uplink resource.

Further, this embodiment of the present invention may include: The network device sends, to the second UE, the configuration information indicating the fifth uplink resource. In addition, the configuration information may be the same as or different from configuration information sent by the network device to the first UE. In addition, the network device may separately send the configuration information to the first UE and the second UE by using a same message, for example, separately send, to the first UE and the second UE by using terminal device-specific higher layer signaling, the configuration information indicating the fifth uplink resource. Alternatively, the network device may separately send the configuration information to the first UE and the second UE by using different messages, for example, send, to the second UE by using terminal device-specific higher layer signaling, first configuration information indicating the fifth uplink resource, and send, to the first UE by using a broadcast message or cell-specific higher layer signaling second configuration information indicating the fifth uplink resource. Alternatively, the network device may send a same message to the first UE and the second UE together in a broadcast manner.

In this step, a receiver or a transceiver in the second terminal device may perform a receiving action, and a transmitter or a transceiver in the network device may perform a sending action.

Step 603: The second UE sends some or all first signals on the first n symbols in the fifth uplink resource, where n is a positive integer greater than or equal to 1, and n is less than M.

In this step, a transmitter or a transceiver in the second terminal device may perform a sending action.

This step is an optional step.

It should be noted that when the second UE needs to send uplink information, the second UE sends the first signal on the first k symbols in the fifth uplink resource. When the second UE does not need to send uplink information, the second UE does not send the first signal on the first k symbols in the fifth uplink resource. The uplink information herein is data and/or control information of a URLLC service.

Further, the fifth uplink resource may be a part or all of the first uplink resource, or a part of the fifth uplink resource overlaps with a part or all of the first uplink resource. Therefore, the first signal may be sent on a resource included in the first uplink resource, or may be sent on the first uplink resource.

In addition, the first signal may occupy more resources.

The first signal may be referred to as a reference signal, or may certainly be another signal. The network device may configure the first signal for the second UE. The first signal is a second UE-specific signal. The network device may implement, by detecting the first signal, a function carried by the first signal. For example, if the first signal is used to identify the second UE, the network device configures different first signals for different UEs. The network device identifies the second UE by detecting the first signal configured for the second UE.

Further, this embodiment of the present invention may include: The network device sends configuration information of the first signal to the second UE. The configuration information specifically includes a location of a resource occupied by the first signal, a sequence used by the first signal, and the like. Alternatively, the network device may send configuration information of the first signal to the first UE.

The first signal may specifically include any one of the following functions or any combination of at least two of the following functions:

The first signal is used to identify the second UE; the first signal is used to perform channel estimation on the uplink information sent by the second UE; the first signal is used to indicate uplink sending timing adjustment of the second terminal device; the first signal is used to instruct the second terminal device to occupy the uplink resource; the first signal is used to indicate uplink sending timing adjustment of the second terminal device; or the first signal is used to instruct the second terminal device to send control information of the uplink information, where the control information includes at least one of a modulation and coding scheme, a hybrid automatic repeat request HARQ process number, a redundancy version (RV), or a new data indicator (NDI).

For example, the first signal may be a signal that is preconfigured by the network device for the second UE and that is generated based on a specific sequence. The sequence may identify the second UE. Specifically, the network device may send configuration information of the specific sequence to the second UE by using higher layer signaling.

Similarly, the first signal may be a signal that is preconfigured by the network device for the second UE and that is generated based on a specific sequence. The sequence may correspond to a transport block size. Therefore, different sequences may correspond to different transport block sizes.

Alternatively, the specific sequence can identify both the second UE and a transport block size.

Optionally, the first signal occupies some frequency domain resources in the first n symbols. For example, the second UE sends the first signal on the first n symbols in frequency domain in a comb-like manner. For a remaining frequency domain resource in the first n symbols, the first UE may send the uplink information on the remaining frequency domain resource, or the second UE may send the uplink information on the remaining frequency domain resource.

Step 604: The first UE sends uplink information to the network device on a fourth uplink resource, where the fourth uplink resource is a resource other than a second uplink resource in the first uplink resource, the second uplink resource is a subset of a third uplink resource, and the third uplink resource is an intersection between the fifth uplink resource and the first uplink resource.

In this step, a transmitter or a transceiver in the first terminal device may perform a sending action.

In this embodiment, if the second UE sends the uplink information on the fifth uplink resource, the third uplink resource in the first uplink resource is unavailable to the first UE; otherwise, the uplink information sent by the second UE is interfered, and reliability is reduced.

If the second UE does not send the uplink information on the fifth uplink resource, the third uplink resource in the first uplink resource is available to the first UE. This embodiment of the present invention provides a plurality of manners, so that the first UE can use a part or all of the third uplink resource, to further improve resource utilization without affecting reliability of sending the uplink information by the second UE.

To achieve the foregoing effect, in the solution of this embodiment of the present invention, the fifth uplink resource may include three parts of resources. A first part of resources is the first n symbols in the fifth uplink resource. The second UE sends the first signal on the first n symbols in the fifth uplink resource, where n is a positive integer greater than or equal to 1. A second part of resources is a resource corresponding to a first time period. The resource corresponding to the first time period may be an $(n+1)^{th}$ symbol to an $(n+a)^{th}$ symbol, where a is an integer greater than or equal to 1. To be specific, the first time period may include one or more symbols. A third part of resources is an $(n+a+1)^{th}$ symbol to an $(n+M-1)^{th}$ symbol. In this embodiment of the present invention, the third part of resources is referred to as a resource after the first time period in the fifth uplink resource.

Optionally, the fifth uplink resource may be a mini-slot.

This embodiment of the present invention provides three implementations, so that the first UE obtains information indicating whether the third part of resources is available. The three implementations are described in detail below with reference to the accompanying drawings.

Figure 7:
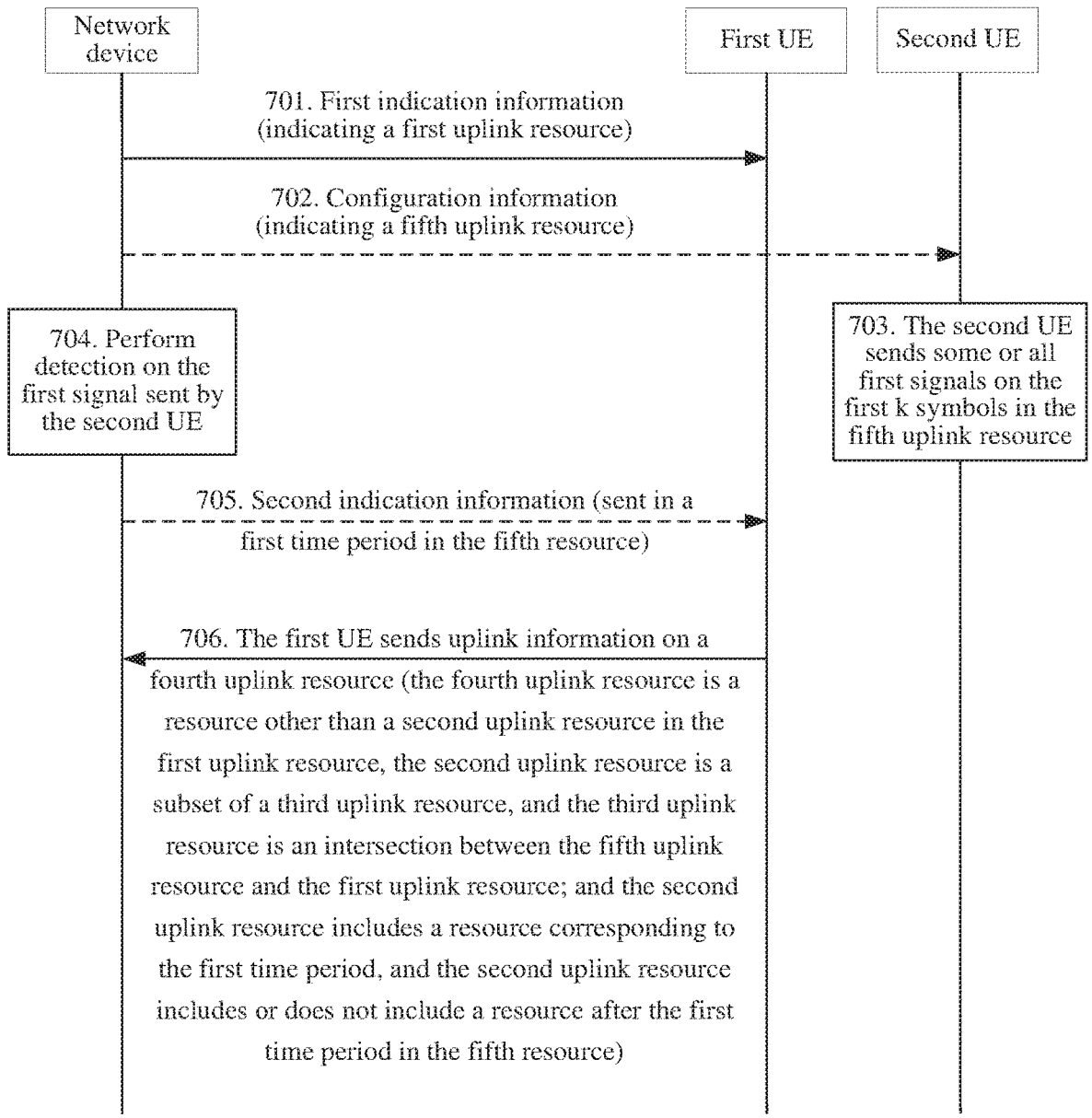
FIG. 7 is a schematic signaling diagram in a first implementation according to Embodiment 1 of the present invention.

FIG. 7 is a schematic signaling diagram in a first implementation according to Embodiment 1 of the present invention. For steps same as those in FIG. 6, refer to the foregoing descriptions. Details are not described herein again.

In this implementation, steps 701 to 703 are the same as steps 601 to 603. For details, refer to the foregoing descriptions.

Step 704: The network device performs detection on the first signal sent by the second UE.

Because the fifth uplink resource is configured by the network device for the second UE, or the fifth uplink resource is predefined, the network device can determine the fifth uplink resource based on predefined configuration information. Therefore, the network device performs detection on the first signal in the fifth uplink resource.

If the first signal is detected in the fifth uplink resource in step 704, the network device can determine that the second UE is to send uplink information on the fifth uplink resource. In this case, the network device can determine that a resource (namely, the $(n+a+1)^{th}$ symbol to the $(n+M-1)^{th}$ symbol that are in the fifth uplink resource and that are described above) after a first time period in the fifth uplink resource cannot be used by the first UE. In other words, the resource after the first time period in the fifth uplink resource is unavailable.

If the first signal is not detected in the fifth uplink resource in step 704, the network device can determine that the second UE does not send uplink information on the fifth uplink resource. In this case, the network device can determine that a resource after a first time period in the fifth uplink resource can be used by the first UE. In other words, the resource after the first time period in the fifth uplink resource is available.

In this step, a processor in the network device performs a detection action.

The first implementation is described below with reference to a specific example. In this example, the first UE is eMBB UE, and the second UE is URLLC UE. The fifth uplink resource is a semi-statically configured resource on which UL grant free data is sent, and is referred to as a grant free resource in this example. The fifth uplink resource may be referred to as a mini-slot. However, it should be noted that the fifth uplink resource in this embodiment of the present invention is not limited to the mini-slot, or may be a resource including a plurality of symbols each with a subcarrier spacing of $f_2$.

Figure 8:
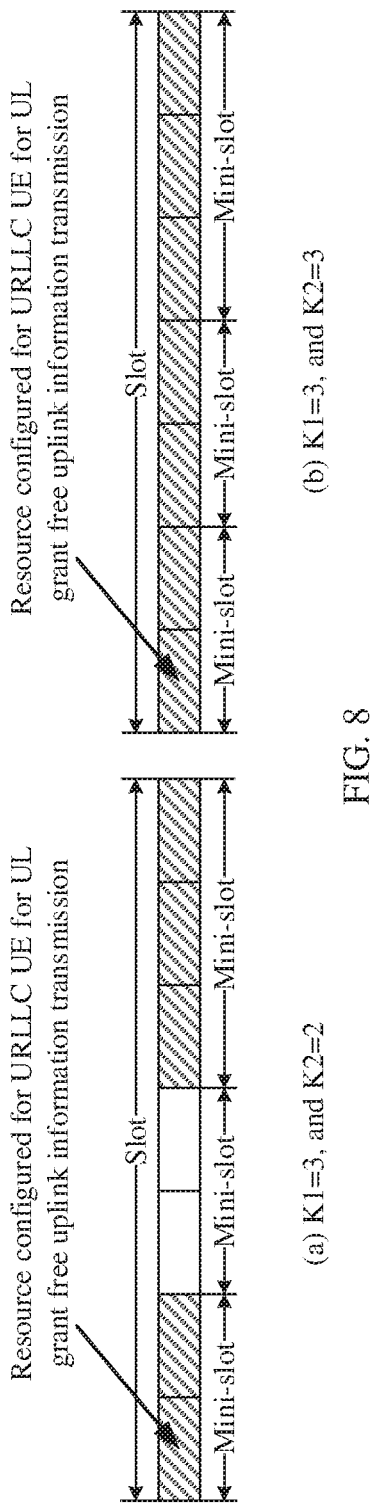
FIG. 8 is a schematic diagram of examples of a resource that is configured for URLLC UE and on which UL grant free uplink data may be sent and a first uplink resource configured for eMBB UE according to an embodiment of the present invention.

With reference to the foregoing example, the first UE may determine that the URLLC UE may send UL grant free uplink data on a resource in slot #i. FIG. 8 is a schematic diagram of examples of a resource that is configured for URLLC UE and on which UL grant free uplink data may be sent and a first uplink resource configured for eMBB UE according to an embodiment of the present invention. As shown in FIG. 8, if the slot #i includes $K_1$ mini-slots, the resource on which the URLLC UE may send the UL grant free uplink information on the resource in the slot #i may be a resource in $K_2$ mini-slots, where $K_2$ is less than or equal to $K_1$. As shown in FIG. 8(a), $K_1$=3, and $K_2$=2. In other words, the slot #i includes three mini-slots, and a first mini-slot and a third mini-slot that are in the slot #i are configured for the URLLC UE and used as the resource on which the UL grant free uplink information is sent. In FIG. 8(b), $K_1$=3, and $K_2$=3.

Alternatively, as described above, subcarrier spacings corresponding to the eMBB UE and the URLLC UE may be different. In this case, a subcarrier spacing corresponding to a first uplink resource configured for the eMBB UE is different from a subcarrier spacing of a fifth uplink resource configured for the URLLC UE. However, the two resources may overlap or partially overlap. A difference lies in that lengths of symbols in the two resources are different. If a subcarrier spacing used by the eMBB UE to send uplink information in the slot #i is 15 kHz, and one slot time with a subcarrier spacing of 15 kHz includes $K_3$ slots each with a subcarrier spacing of 60 kHz, a resource on which the URLLC UE may send the UL grant free uplink information on a resource in the slot #i is $K_4$ slots, where $K_4$ is less than or equal to $K_3$.

Specifically, in this embodiment, if the first UE determines that the slot #i includes grant-free (GF) resources configured for another UE, the first UE does not send uplink information on a resource that is in these GF resources configured for the another UE and that is used to send a first signal (for example, a reference signal (RS)). The first UE does not occupy these resources, to ensure that if the URLLC UE sends the uplink information on a configured resource, the resource on which the URLLC UE sends the RS is not interfered with by the first UE. The RS sent by the URLLC UE may undertake many important functions.

For example, a first function of the RS sent by the URLLC UE: The RS undertakes a function of identifying UE that sends UL grant free. The network device may preconfigure a specific time and/or frequency resource for two or more UEs. When there is no centralized scheduling by the network device, the two or more UEs may simultaneously send the UL grant free uplink information at a same specific time and/or on a same specific frequency resource. The network device may configure different RSs for these UEs, so that the network device can identify UEs that are in these UEs and that send the UL grant free uplink information. For a plurality of UEs configured to send the UL grant free at the same time and/or on the same frequency resource, configured RSs are orthogonal to each other. The network device may determine, by detecting the RS, UEs that send the UL grant free uplink information on a preconfigured resource. Therefore, the RS undertakes the function of identifying the UE that sends the UL grant free.

Another function of the RS sent by the URLLC UE: includes at least one function of performing demodulation channel estimation on uplink information of the URLLC UE, indicating uplink sending timing adjustment of the URLLC UE, instructing the URLLC UE to occupy a UL grant free resource, carrying control information of UL grant free uplink information sent by the URLLC UE, and the like. The control information of the UL grant free uplink information sent by the URLLC UE includes at least one of a modulation and coding scheme, a hybrid automatic repeat request (HARQ) process number, a redundancy version (RV), a new data indicator (NDI), and the like.

If uplink information of the first UE collides with a reference signal of the URLLC UE, the network device cannot identify, based on the reference signal of the second UE, UL grant free data sent by the URLLC UE, or complete the another function based on the reference signal sent by the URLLC UE. Consequently, the network device cannot correctly demodulate the UL grant free data of the URLLC UE, effectively and correctly schedule subsequent uplink information of the URLLC UE, or the like. Therefore, the first UE determines, based on first indication information, the first uplink resource, in the slot #i, that is scheduled by the network device and that is used to send the uplink information. If the first uplink resource overlaps with the fifth uplink resource that is configured by the network device for the URLLC UE and that is used to send the UL grant free uplink information, when sending the uplink information, the first UE needs to free up at least a resource that is in the resource configured for the URLLC UE and that is used to send the reference signal.

Therefore, in this embodiment, regardless of whether the second UE sends the uplink information on the configured fifth uplink resource, if the first UE determines that the first uplink resource includes the fifth uplink resource configured for the second UE, the first UE does not send the uplink information on a resource that is included in the first uplink resource and that is used by the second UE to send the reference signal.

Figure 9:
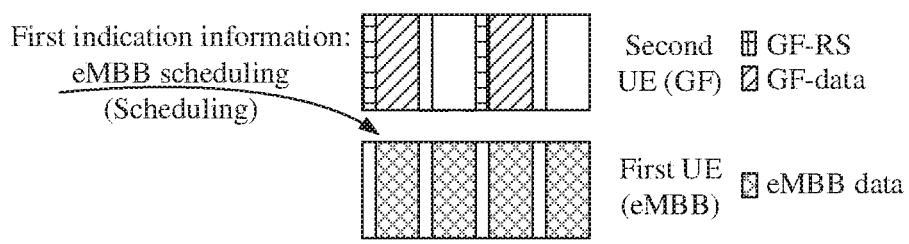
FIG. 9 is a schematic diagram of a relationship between uplink information sent by first UE and uplink information sent by second UE according to an embodiment of the present invention.

Because the first UE does not know whether the URLLC UE sends the uplink information on an overlapped part between the first uplink resource and the fifth uplink resource configured for the URLLC UE, if the URLLC UE needs to send burst data, the URLLC UE sends a reference signal. When the first UE does not free up a corresponding resource on which the URLLC UE sends the reference signal, the uplink information of the first UE collides with the reference signal of the URLLC UE. Consequently, the network device cannot identify, based on the reference signal of the second UE, that the second UE sends the UL grant free data. Therefore, the first UE does not send the uplink information on an RS resource in the GF resources configured for the another UE. FIG. 9 is a schematic diagram of a relationship between uplink information sent by first UE and uplink information (for example, data) sent by second UE according to an embodiment of the present invention.

As shown in FIG. 9, the uplink information sent by the first UE does not occupy a resource at an RS location of the URLLC UE. An upper part in FIG. 9 indicates that functions of different pails in a resource configured for the URLLC UE are not actually fully used. A lower part in FIG. 9 indicates a case in which the eMBB UE actually sends data.

Step 705: The network device sends second indication information to the first UE in a first time period. Correspondingly, the first UE receives, in the first time period, the second indication information sent by the network device.

In this step, a transmitter or a transceiver in the network device performs a sending action. Further, after detecting the first signal, a processor in the network device may trigger the transmitter or the transceiver to perform the sending action. A receiver or a transceiver in the first terminal device performs a receiving action.

This step is an optional step.

Optionally, the second indication information may indicate that a resource after the first time period in the fifth uplink resource is available. Alternatively, the second indication information may indicate that a resource after the first time period in the third uplink resource is available. The two types of indication information are the same, may be used alternatively, and are not distinguished in this embodiment of the present invention. For example, the second indication information is sent only when the resource after the first time period in the fifth uplink resource is available; or the second indication information is not sent when the resource after the first time period in the fifth uplink resource is unavailable.

Alternatively, the second indication information may indicate that a resource after the first time period in the fifth uplink resource is unavailable. For example, the second indication information is sent only when the resource after the first time period in the fifth uplink resource is unavailable; or the second indication information is not sent when the resource after the first time period in the fifth uplink resource is available.

Alternatively, the second indication information may indicate whether a resource after the first time period in the fifth uplink resource is available. For example, when the resource after the first time period in the fifth uplink resource is unavailable, the second indication information used to indicate that the resource after the first time period in the fifth uplink resource is unavailable is sent; or when the resource after the first time period in the fifth uplink resource is available, the second indication information used to indicate that the resource after the first time period in the fifth uplink resource is available is sent.

It should be noted that a meaning indicated by the second indication information in this embodiment is not limited to the foregoing description. For example, the second indication information may indicate whether the resource after the first time period in the fifth uplink resource is occupied by the second UE, or the like. For details on how to send the second indication information, refer to the foregoing descriptions.

Further, the second indication information may be sent by using physical layer signaling, for example, information sent on a physical control channel.

Step 706: The first UE sends uplink information to the network device on a fourth uplink resource, where the fourth uplink resource is a resource other than a second uplink resource in the first uplink resource, the second uplink resource is a subset of a third uplink resource, and the third uplink resource is an intersection between the fifth uplink resource and the first uplink resource; and the second uplink resource includes a resource corresponding to the first time period.

In this step, a transmitter or a transceiver in the first terminal device performs a sending action, and a receiver or a transceiver in the network device performs a receiving action.

Further, the first UE determines, based on a receiving status of the second indication information or content indicated by the second indication information, a resource specifically included in the second uplink resource.

For example, if the network device sends the second indication information only when the resource after the first time period in the fifth uplink resource is unavailable, the first UE can determine, when receiving the second indication information in the first time period, that the resource after the first time period in the fifth uplink resource is unavailable. Therefore, the second uplink resource includes the resource after the first time period in the fifth uplink resource. However, the first UE can determine, when the first UE does not receive the second indication information in the first time period, that the resource after the first time period in the fifth uplink resource is available. Therefore, the second uplink resource does not include the resource after the first time period in the fifth uplink resource, and the fourth uplink resource includes the resource after the first time period in the fifth uplink resource.

For another example, if the network device sends the second indication information only when the resource after the first time period in the fifth uplink resource is available, the first UE can determine, when receiving the second indication information in the first time period, that the resource after the first time period in the fifth uplink resource is available. Therefore, the second uplink resource does not include the resource after the first time period in the fifth uplink resource, and the fourth uplink resource includes the resource after the first time period in the fifth uplink resource. However, the first UE can determine, when the first UE does not receive the second indication information in the first time period, that the resource after the first time period in the fifth uplink resource is unavailable. Therefore, the second uplink resource includes the resource after the first time period in the fifth uplink resource, and the fourth uplink resource does not include the resource after the first time period in the fifth uplink resource.

For another example, if the second indication information may indicate whether the resource after the first time period in the fifth uplink resource is available, when the first UE receives the second indication information in the first time period, and the second indication information indicates that the resource after the first time period in the fifth uplink resource is available, the first UE can determine that the resource after the first time period in the fifth uplink resource is available. Therefore, the second uplink resource does not include the resource after the first time period in the fifth uplink resource, and the fourth uplink resource includes the resource after the first time period in the fifth uplink resource. However, the first UE receives the second indication information in the first time period, and the second indication information indicates that the resource after the first time period in the fifth uplink resource is unavailable. Therefore, the second uplink resource includes the resource after the first time period in the fifth uplink resource, and the fourth uplink resource does not include the resource after the first time period in the fifth uplink resource.

It should be noted that in this embodiment of the present invention, the resource after the first time period in the fifth uplink resource is the same as the resource after the first time period in the third uplink resource. Therefore, the resource after the first time period in the fifth uplink resource may also be referred to as the resource after the first time period in the third uplink resource.

It should be noted that an execution sequence of the steps in this embodiment of the present invention is not limited. For example, steps 705 and 706 may be simultaneously performed. For example, the first UE may send the uplink information on the first one or more symbols in the first uplink resource, and simultaneously receive the second indication information, to determine that a third part of the second uplink resource is unavailable. Then, the first UE may continue to send the uplink information on a resource that is in the first uplink resource and that is after the fifth uplink resource.

Further, if the fifth uplink resource is a subset of the first uplink resource, the second uplink resource includes a resource that is in the third uplink resource and that is used by the second UE to send some or all first signals, for example, a first part of the fifth uplink resource described above, namely, the first n symbols in the fifth uplink resource. In this implementation, the first UE (for example, the eMBB UE) does not occupy, on a scheduled resource, a resource that is in the fifth uplink resource and on which the second UE sends a first signal (for example, a reference signal). If the fifth uplink resource is a UL grant free configuration resource, when sending the uplink information, the first UE can bypass the resource that is in the UL grant free configuration resource and that is used to send the first signal, to ensure performance of the first signal and improve reliability of detecting the first signal by the network device.

When a part of the fifth uplink resource overlaps with a part or all of the first uplink resource, in other words, the first part of the fifth uplink resource does not belong to the first uplink resource, for example, may be one or more symbols at the end of a slot before a slot in which the first uplink resource is located, the fifth uplink resource further includes a resource that is before the third uplink resource and that is used by the second terminal device to send some or all first signals. In this case, the second uplink resource does not include the resource used by the second terminal device to send some or all the first signals.

Optionally, the fifth uplink resource in this embodiment may be a resource for sending uplink scheduling-free data (which may also be referred to as a resource for sending uplink grant-free data, or referred to as an uplink grant-free resource or an uplink scheduling-free resource). In this way, in this embodiment, the first UE may determine that the third uplink resource or the fifth uplink resource is a UL grant free resource.

It should be noted that the UL grant free resource may not be limited to the fifth uplink resource, and may further include another resource that does not overlap with the first uplink resource.

The fifth uplink resource may be a predefined resource. The first UE may determine the fifth uplink resource based on a preset setting. The fifth uplink resource may also be a UL grant free resource semi-statically configured by the network device. The first UE may determine the fifth uplink resource by using configuration information received in advance from the network device and the first uplink resource.

With reference to the foregoing example, further, the first UE does not send the uplink information on the RS resource in the GF resources configured for the another UE, and in addition, does not occupy a resource in a GAP time after the RS resource, in other words, does not occupy the resource corresponding to the first time period in the fifth uplink resource described above. In this embodiment, the first time period is referred to as a GAP. The first UE does not occupy the resource in the GAP time, to determine, in the GAP, whether the URLLC UE sends the uplink information on the configured GF resource. If the eMBB UE determines that the URLLC UE sends the uplink information on the configured GF resource, the eMBB UE does not occupy a resource that is after the GAP time and that is configured by the URLLC UE to send GF data. If the eMBB UE determines that the URLLC UE does not send the uplink information on the configured GF resource, the eMBB UE may occupy a resource that is after the GAP time and that is configured by the URLLC UE to send GF data. Specifically, in a TDD system, the eMBB UE further needs to be adjusted from a signal receiving state to a signal sending state in the GAP time.

Figure 10:
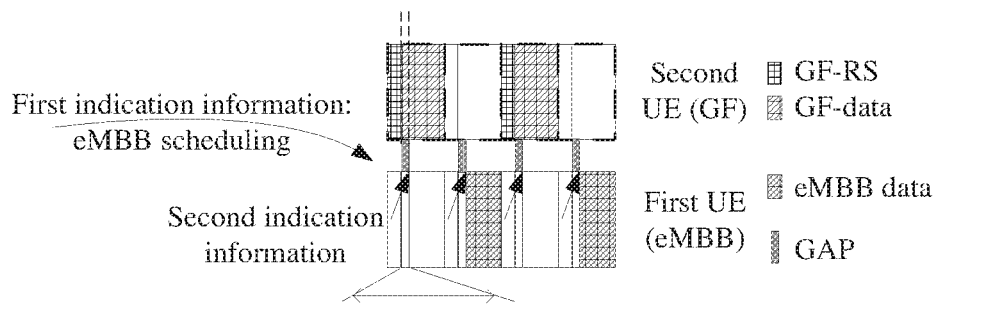
FIG. 10 is a schematic diagram of a relationship between uplink information sent by first UE and uplink information sent by second UE in a first implementation according to Embodiment 1 of the present invention.

FIG. 10 is a schematic diagram of a relationship between uplink information sent by first UE and uplink information sent by second UE in a first implementation according to Embodiment 1 of the present invention. As shown in FIG. 10, the first UE determines, by using second indication information sent by a base station, whether the URLLC UE sends UL grant free uplink information. Because the URLLC UE sends the UL grant free uplink information to the network device, the network device may implement maximum reliability of detecting the UL grant free uplink information sent by the URLLC UE. Therefore, the network device may determine the second indication information based on a detection result that the URLLC UE sends the UL grant free uplink information, and send the second indication information to the first UE. The first UE may determine, based on the second indication information, whether the uplink information can be sent on an overlapped resource between a resource after a first time period in a third uplink resource and a first uplink resource.

It should be noted that in this embodiment of the present invention, the resource after the first time period in the third uplink resource is the same as a resource after the first time period in a fifth uplink resource. The two resources may be used alternatively, and are not distinguished in this embodiment of the present invention.

In this implementation, the network device determines, by detecting an RS sent by the URLLC UE, whether the URLLC UE sends the UL grant free uplink information, and sends the detection result to the first UE by using the second indication information. Then, the network device requires a specific time to detect and process the RS sent by the URLLC UE, and to generate the second indication information, and the first UE requires a specific time to receive and process the second indication information. If the first UE sends the uplink information in the processing time, when the detection result is that the second UE sends the UL grant free uplink information, the uplink information of the first UE collides with the uplink information of the second UE within the processing time. Consequently, both uplink transmission performance of the first UE and uplink transmission performance of the second UE are affected. Therefore, the first UE does not send the uplink information on the RS resource in the GF resources configured for the another UE, and in addition, does not occupy a resource in a GAP time after the RS resource. The network device detects, in the GAP time, the RS sent by the URLLC UE to determine whether the URLLC UE sends the UL grant free uplink information, and sends the detection result to the first UE by using the second indication information. In this way, reliability of sending the uplink information by the second UE can also be enhanced.

In the solution of this embodiment, the first UE can learn, by receiving the second indication information sent by the base station, whether a part of the uplink resource allocated to the second UE can be used, so that even if the resource is configured for the second UE, the second UE can use, in some scenarios, the resource configured for the second UE to send the uplink information. Therefore, resource utilization efficiency can also be improved while reliability of sending the uplink information by the second UE is improved.

Further, in this embodiment, the first UE (for example, the eMBB UE) does not occupy, on a scheduled resource, a resource that is in the UL grant free configuration resource and on which the first signal is sent, and does not occupy a resource adjacent to the resource on which the first signal is sent. In addition, the first UE does not occupy, according to the second indication information, a resource that has been occupied when the second UE sends the UL grant free data, to reduce interference in sending the uplink information by the second UE, and improve reliability of sending the uplink information by the second UE. Further, in this embodiment, dynamic orthogonal multiplexing is implemented between a transmission resource of an eMBB uplink service and a transmission resource of a URLLC uplink service. It is ensured that the eMBB UE does not occupy an RS resource of the URLLC UE, and the eMBB UE does not simultaneously occupy, when the URLLC UE transmits an uplink service, a resource on which the URLLC UE transmits the uplink service, to ensure resource utilization efficiency and transmission performance of each of the eMBB uplink service and the URLLC uplink service.

Further, when the first uplink resource is a slot whose subcarrier spacing may be $f_1$, and the fifth uplink resource is a plurality of mini-slots each with a subcarrier spacing of $f_1$, the first UE separately uses the solution of this embodiment in the plurality of mini-slots. Alternatively, when the first uplink resource is a slot with a subcarrier spacing of $f_1$, and the fifth uplink resource is a slot with a subcarrier spacing of $f_2$, the first UE separately uses the solution of this embodiment in a plurality of slots each with a subcarrier spacing of $f_2$.

Figure 11:
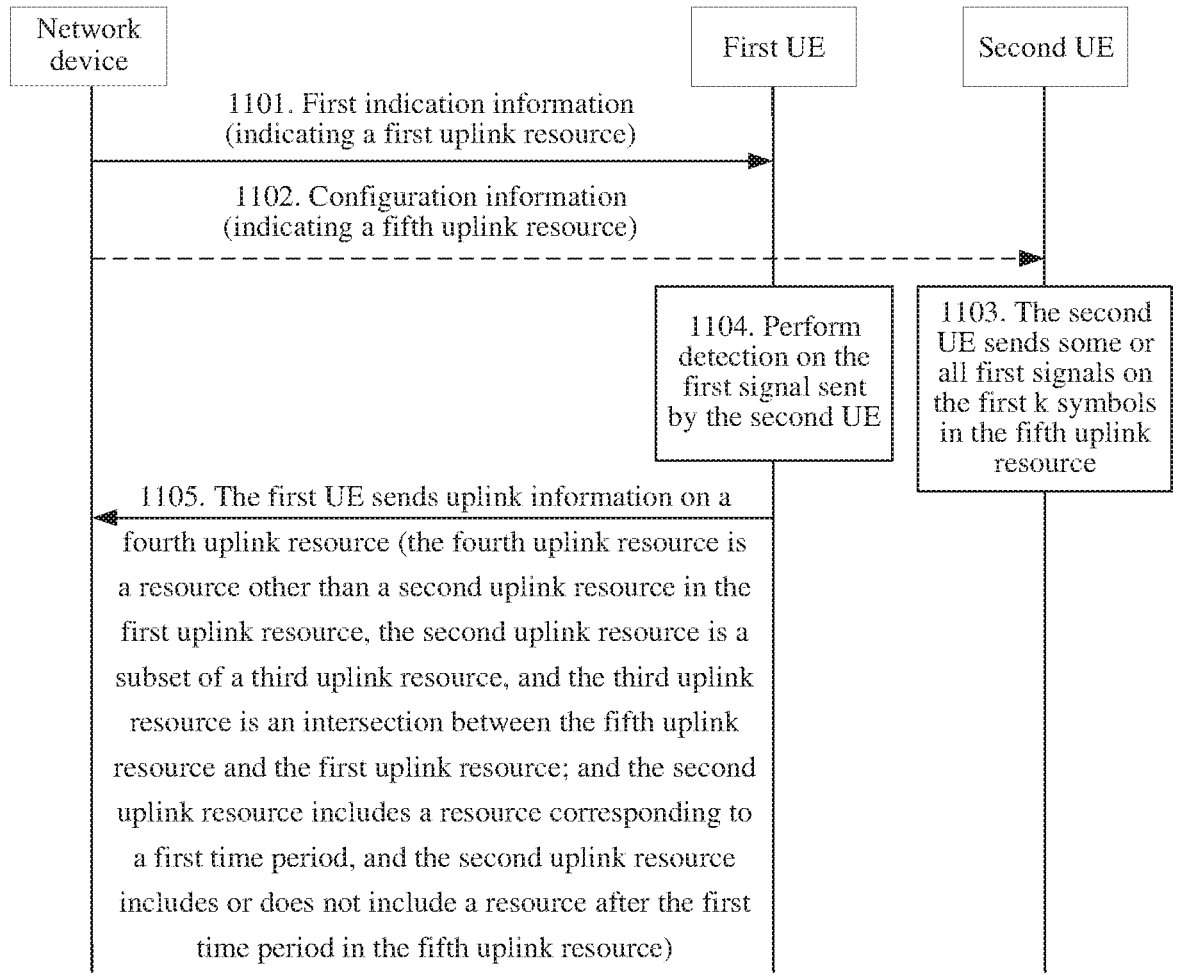
FIG. 11 is a schematic signaling diagram in a second implementation according to Embodiment 1 of the present invention.

FIG. 11 is a schematic signaling diagram in a second implementation according to Embodiment 1 of the present invention. For steps same as those in FIG. 6 and FIG. 7, refer to the foregoing descriptions. Details are not described herein again.

Steps 1101 to 1103 included in the second implementation are the same as steps 701 to 703 included in the first implementation.

Step 1104: The first UE performs detection on the first signal sent by the second UE.

In this step, a processor in the first terminal device may perform a detection action.

Step 1105: The first UE sends uplink information on a fourth uplink resource, where the fourth uplink resource is a resource other than a second uplink resource in the first uplink resource, the second uplink resource is a subset of a third uplink resource, and the third uplink resource is an intersection between the fifth uplink resource and the first uplink resource; and the second uplink resource includes a resource corresponding to the first time period.

In this step, a receiver or a transceiver in the first terminal device may perform a receiving action.

Further, the second uplink resource includes or does not include a resource after the first time period in the fifth uplink resource. For a case in which the second uplink resource includes the resource after the first time period in the fifth uplink resource and a case in which the second uplink resource does not include the resource after the first time period in the fifth uplink resource, refer to the foregoing descriptions.

For example, the first terminal device performs, in the first time period, detection on the first signal sent by the second terminal device. If the first terminal device detects the first signal, the second uplink resource further includes a resource after the first time period in the third uplink resource; and/or if the first terminal device does not detect the first signal, the fourth uplink resource includes the resource after the first time period in the third uplink resource, and the second uplink resource does not include the resource after the first time period in the third uplink resource.

A difference between the second implementation and the first implementation lies in that in the second implementation, the base station does not perform detection on the first signal sent by the second UE, but the first UE performs detection on the first signal sent by the second UE, and determines the first time period in the fifth uplink resource based on a detection result of the first signal.

Figure 12:
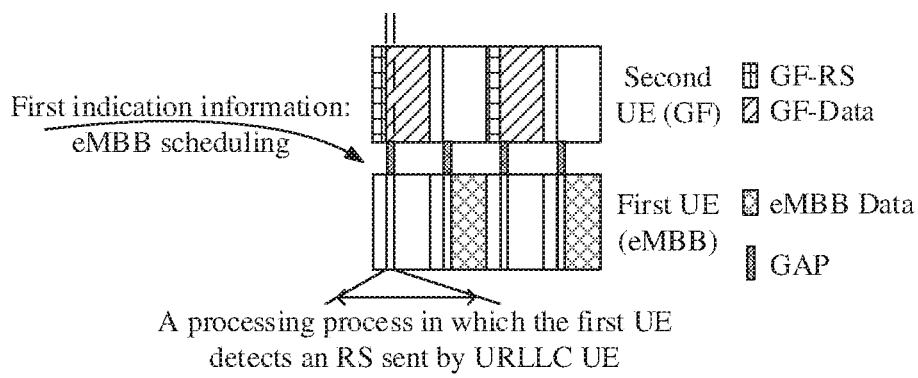
FIG. 12 is a schematic diagram of a relationship between uplink information sent by first UE and uplink information sent by second UE in a second implementation according to Embodiment 1 of the present invention.

FIG. 12 is a schematic diagram of a relationship between uplink information sent by first UE and uplink information sent by second UE in a second implementation according to Embodiment 1 of the present invention. With reference to the foregoing example, as shown in FIG. 12, the first UE identifies, by detecting whether a reference signal sent by the URLLC UE is received, whether the URLLC UE sends UL grant free uplink information. A specific processing time is required for a detection process of the first UE. The first UE does not determine, in the processing time, whether the reference signal sent by the URLLC UE is detected. If the first UE sends the uplink information in the processing time, when a detection result is that the URLLC UE sends the UL grant free uplink information, the uplink information of the first UE collides with the uplink information of the URLLC UE within the processing time. Consequently, both uplink transmission performance of the first UE and uplink transmission performance of the URLLC UE are affected. Therefore, the first UE does not send the uplink information on the RS resource in the GF resources configured for the another UE, and in addition, does not occupy a resource in a GAP time after the RS resource. The first UE needs to perform, in the GAP time, a processing process of detecting the RS sent by the URLLC UE. Specifically, in a TDD system, the first UE further needs to be adjusted from a signal receiving state to a signal sending state in the GAP time.

In the foregoing two implementations, the first UE does not send the uplink information on the RS resource in the GF resources configured for the another UE, and in addition, does not occupy the resource in the GAP time after the RS resource. In addition, the first UE determines, based on an indication of the second indication information or a detection status of the RS, whether to occupy a resource other than the RS and the resource in the GAP time after the RS in the GF resources of the another UE.

In the foregoing first implementation, the second indication information may indicate two cases. In a first case, the first UE can occupy a resource other than the RS and the resource in the GAP in the GF resources configured for the another UE. In a second case, the first UE cannot occupy a resource other than the RS and the resource in the GAP in the GF resources configured for the another UE.

It should be noted that in the foregoing solution, whether the first UE can occupy the resource other than the RS and the resource in the GAP in the GF resources configured for the another UE depends on whether the first UE or the network device detects, based on the RS resource sent by the URLLC UE, that the another UE sends the RS on the GF resources.

Therefore, optionally, to ensure that the first UE obtains, as soon as possible, information indicating whether the resource other than the RS and the resource in the GAP in the GF resources configured for the another UE can be used, a location at which the URLLC UE sends the RS needs to be located in the GF resources as early as possible, for example, a first symbol in the GF resources.

Figure 13:
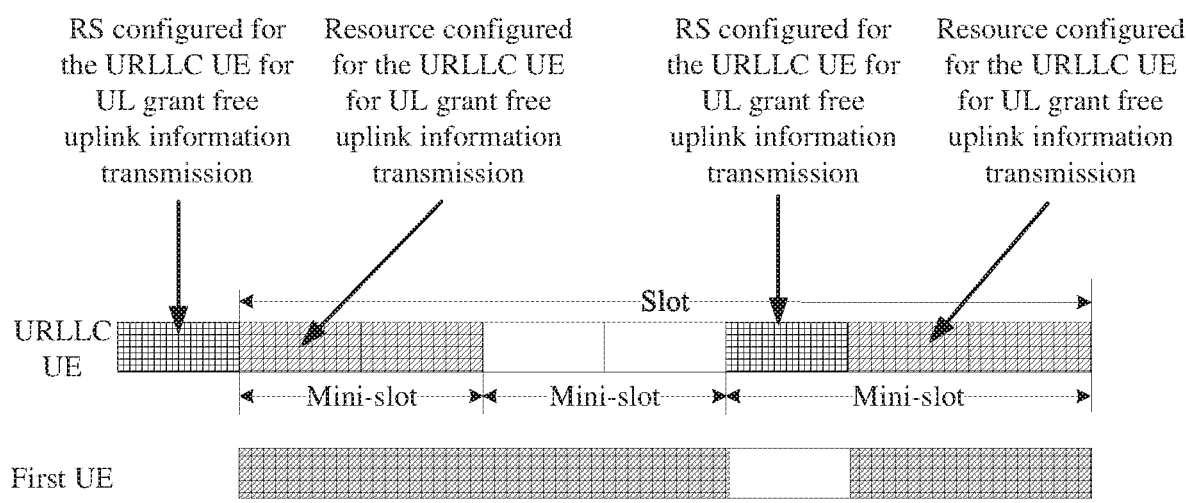
FIG. 13 is a schematic diagram of a possible relationship between a first uplink resource and a fifth uplink resource according to an embodiment of the present invention.

Further, because the first UE does not send the uplink information on the RS resource in these GF resources configured for the another UE, if the RS resource in the GF resources of the another UE is located on the first symbol in the GF resources, a resource on which the first UUE sends the uplink information in the slot #i cannot certainly start from the first symbol. Consequently, a size of the resource on which the first UE sends the uplink information in the slot #i may be limited. Therefore, in another possible implementation, as shown in FIG. 13, a location at which the URLLC UE sends the RS needs to be located before the slot #i. FIG. 13 is a schematic diagram of a possible relationship between a first uplink resource and a fifth uplink resource according to an embodiment of the present invention.

Optionally, if the fifth uplink resource configured by the network device for the second UE includes a very small quantity of symbols, for example, the GF resources configured by the network device for the another UE are resources on which a mini-slot is used, and all resources in some symbols in the fifth uplink resource are used to send the first signal (for example, an RS), transmission efficiency of the fifth uplink resource is very low. In this way, the second UE sends the first signal on some frequency domain resources in the first n symbols in the fifth uplink resource, to improve transmission efficiency of the fifth uplink resource. In this way, another frequency domain resource in the first n symbols in the fifth uplink resource may be used by the second UE to send the uplink information, or may be used by the first UE to send the uplink information.

Figure 14:
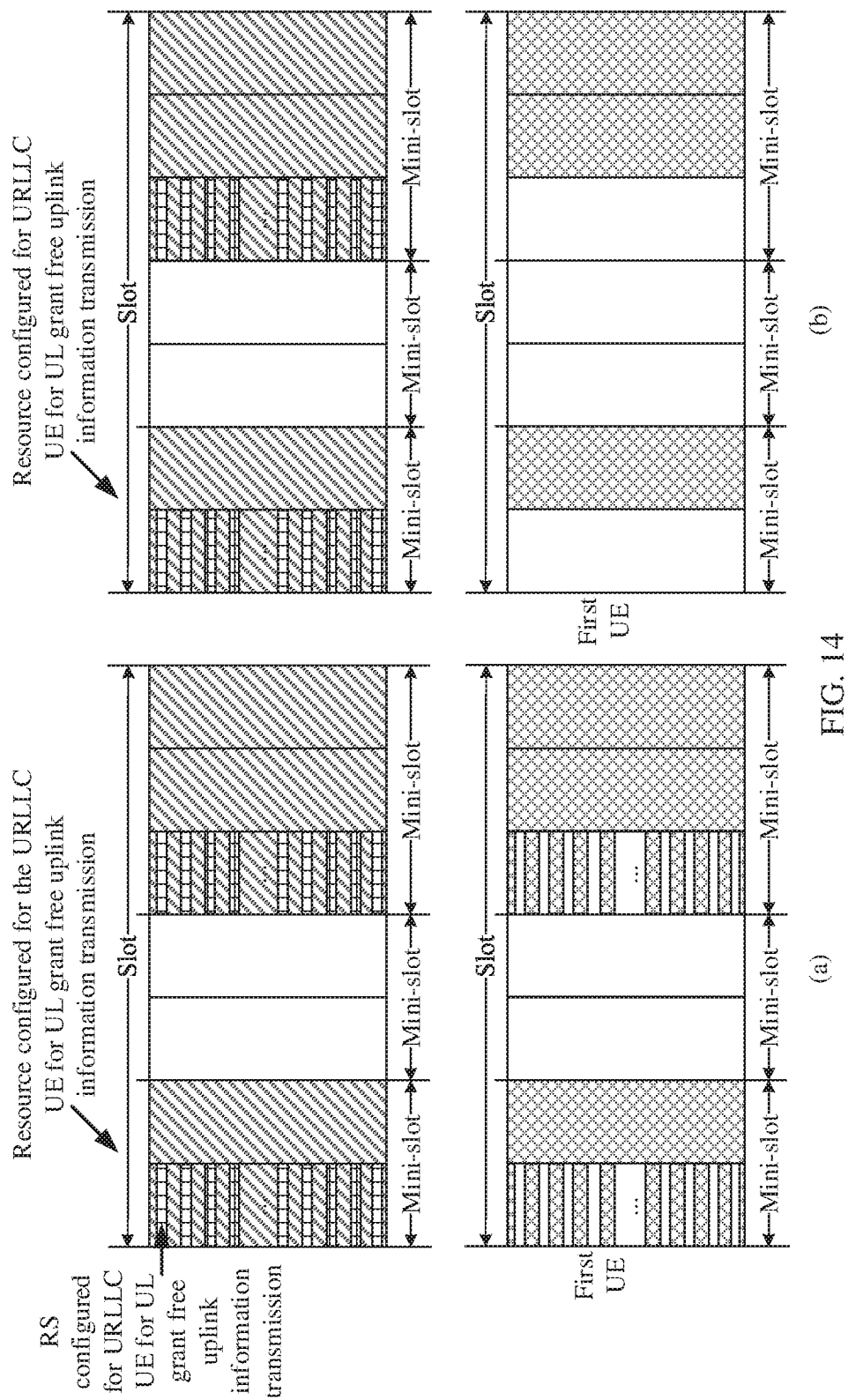
FIG. 14 shows an example of a schematic diagram of sending a first signal on some frequency domain resources according to an embodiment of the present invention.

FIG. 14 shows an example of a schematic diagram of sending a first signal on some frequency domain resources according to an embodiment of the present invention. For example, in FIG. 14, one mini-slot includes two symbols. If all resources in one of the two symbols are used to send the RS, transmission efficiency of uplink information in the mini-slot is very low. In this case, when GF resources configured by a network device for another UE are resources on which the mini-slot is used, some resources in some symbols are used to send the RS. For example, one resource unit on every three subcarriers is used to send the RS. In this case, the first UE may occupy a resource other than an RS in the resource unit configured for GF of another UE. In a manner in FIG. 14(a), the first UE does not occupy only a corresponding RE resource on which the second UE sends the RS, and the first UE may send the uplink information on a resource that is in the resource unit and that is not occupied by the second UE. Alternatively, in a manner in FIG. 14(b), the first UE does not occupy any resource in a symbol on which the RS of the first UE is located, and the second UE may send the uplink information on the resource other than the RS in the configured resource unit.

Figure 15:
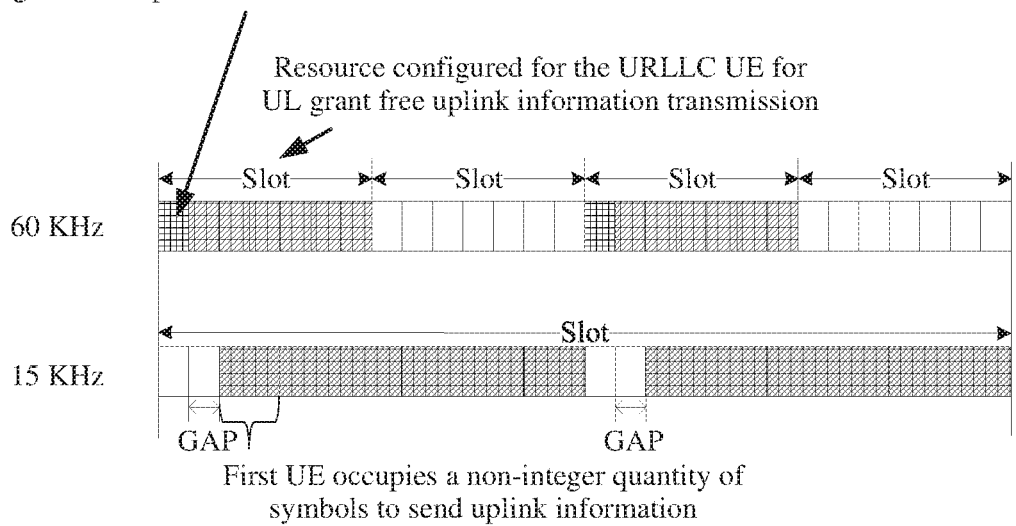
FIG. 15 is a schematic diagram in which a resource, occupied by first UE, after a first time period in a fifth uplink resource is a non-integer quantity of symbols according to an embodiment of the present invention.

Optionally, the resource, occupied by the first UE, after the first time period in the fifth uplink resource may be a non-integer quantity of symbols. For example, if the GF resources configured by the network device for the another UE are resources with large subcarrier spacings, because the resources with the large subcarrier spacings correspond to short symbols, the RS in the GF resources configured by the network device for the another UE and a resource in a GAP time after the RS are not integer quantities of symbols of the first UE. In this case, as shown in FIG. 15, if the first UE may occupy a resource other than the RS and the resource in the GAP in the GF resources configured for the another UE, the uplink information sent by the first UE on these resources may be a non-integer quantity of symbols. FIG. 15 is a schematic diagram in which a resource, occupied by first UE, after a first time period in a fifth uplink resource is a non-integer quantity of symbols according to an embodiment of the present invention.

Figure 16:
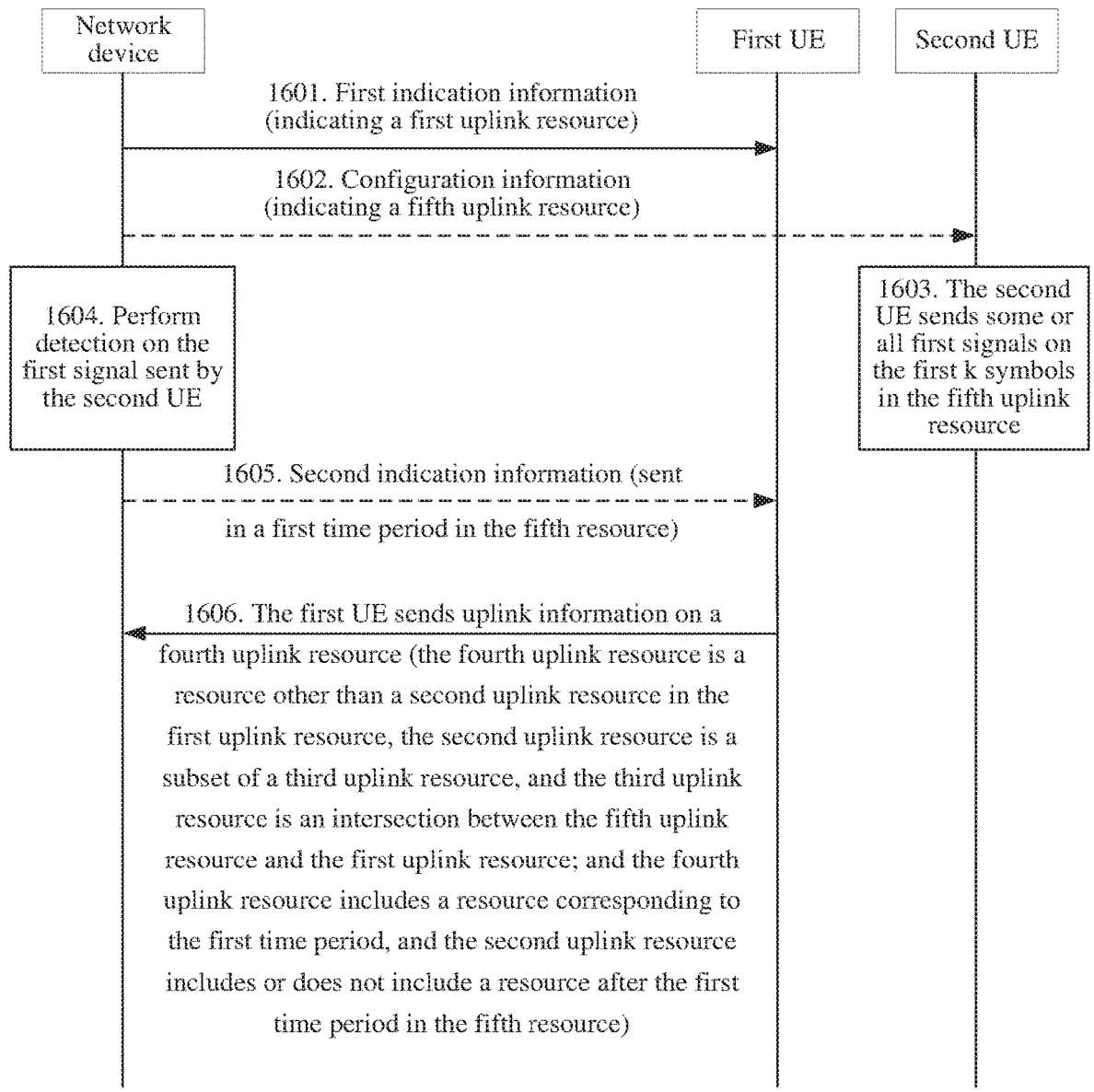
FIG. 16 is a schematic signaling diagram in a third implementation according to Embodiment 1 of the present invention.

FIG. 16 is a schematic signaling diagram in a third implementation according to Embodiment 1 of the present invention. For steps same as those in FIG. 6, FIG. 7, and FIG. 11, refer to the foregoing descriptions. Details are not described herein again.

Steps 1601 to 1605 included in the third implementation are the same as steps 701 to 705 included in the first implementation.

Different from the first implementation, in this embodiment, the first UE sends the uplink information on a resource in the first time period, and the second UE does not send the uplink information on the resource in the first time period. The first UE determines, based on a receiving status of the second indication information in the first time period or content of the second indication information received in the first time period, whether a resource after the first time period is available.

Step 1106: The first UE sends uplink information on a fourth uplink resource, where the fourth uplink resource is a resource other than a second uplink resource in the first uplink resource, the second uplink resource is a subset of a third uplink resource, and the third uplink resource is an intersection between the fifth uplink resource and the first uplink resource; and the fourth uplink resource includes a resource corresponding to the first time period in the third uplink resource.

In this step, a transmitter or a transceiver in the first terminal device may perform a sending action. Further, a receiver or a transceiver in the network device performs a receiving action.

Further, the second uplink resource includes or does not include a resource after the first time period in the fifth uplink resource. For a case in which the second uplink resource includes the resource after the first time period in the fifth uplink resource and a case in which the second uplink resource does not include the resource after the first time period in the fifth uplink resource, refer to the foregoing descriptions.

For example, if the second indication information indicates that a resource after the first time period in the third uplink resource is unavailable, the second uplink resource further includes the resource after the first time period in the third uplink resource.

For another example, if the second indication information indicates that a resource after the first time period in the third uplink resource is available, the fourth uplink resource further includes the resource after the first time period in the third uplink resource, and the second uplink resource does not include the resource after the first time period in the third uplink resource.

Figure 17:
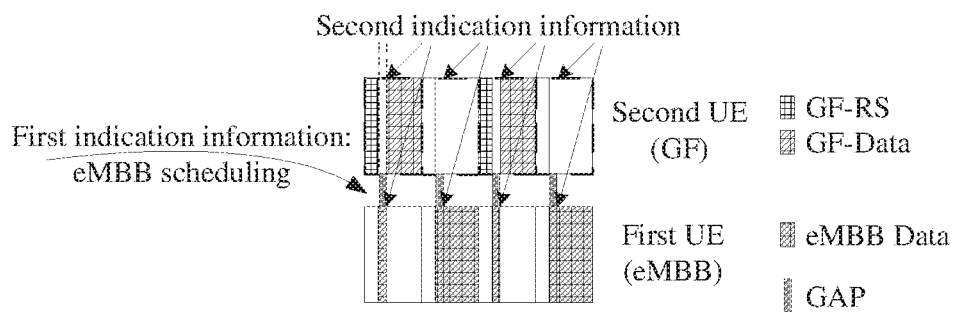
FIG. 17 is a schematic diagram of a relationship between uplink information sent by first UE and uplink information sent by second UE in a third implementation according to Embodiment 1 of the present invention.

Descriptions are further provided with reference to the foregoing example and FIG. 17. FIG. 17 is a schematic diagram of a relationship between uplink information sent by first UE and uplink information sent by second UE in a third implementation according to Embodiment 1 of the present invention. If the first UE determines that the slot #i includes the GF resources configured for the another UE, the first UE does not send the uplink information on the RS resource in these GF (Grant Free) resources configured for the another UE. Details of the third implementation are the same as those of the first implementation. The first UE determines, based on an indication of the second indication information, whether to occupy a resource other than a resource in a GAP time after the RS in the GF resources of the another UE.

The second indication information may indicate two cases. In a first case, the first UE can occupy a resource other than the RS and the resource in the GAP in the GF resources configured for the another UE. In a second case, the first UE cannot occupy a resource other than the RS and the resource in the GAP in the GF resources configured for the another UE.

As shown in FIG. 17, if the second indication information received by the first UE in the GAP time indicates that the first UE cannot occupy the resource other than the RS and the resource in the GAP in the GF resources configured for the another UE, the first UE stops occupying the resource other than the RS and the resource in the GAP in the GF resources configured for the another UE.

In this implementation, if there is burst URLLC uplink information, the second UE sends the RS on an RS resource in GF resources configured for the second UE, but does not occupy resources in a GAP time after the RS resource. The second UE does not occupy these resources, to transmit, to the eMBB UE in the GAP time, information that the second UE occupies a resource other than the RS and the resource in the GAP in the GF resources, so that the eMBB UE stops occupying these resources. The eMBB UE may occupy the resource in the GAP time after the RS resource in the GF resources configured for the another UE, and the URLLC UE does not send the uplink information in the GAP time, to avoid interference with the eMBB UE.

The second terminal device receives, from the network device, configuration information indicating an uplink resource configured for the second terminal device, where the uplink resource includes a plurality of time domain symbols.

The second terminal device sends a first signal on the first n time domain symbols in the plurality of time domain symbols.

The second terminal device sends uplink information on an $(n+k)^{th}$ symbol to a last symbol in the plurality of time domain symbols, where k is an integer greater than or equal to 1.

The first signal is used to identify the second terminal device, or the first signal is used to perform channel estimation on the uplink information, or the first signal is used to indicate uplink sending timing adjustment of the second terminal device, or the first signal is used to instruct the second terminal device to occupy the uplink resource, or the first signal is used to indicate uplink sending timing adjustment of the second terminal device, or the first signal is used to instruct the second terminal device to send control information of the uplink information. The control information includes at least one of a modulation and coding scheme, a hybrid automatic repeat request HARQ process number, a redundancy version (RV), or a new data indicator (NDI).

In this embodiment, when k is greater than 1, the second UE does not send the uplink information on an $(n+1)^{th}$ symbol to an $(n+k-1)^{th}$ symbol. The first UE sends the uplink information on the $(n+1)^{th}$ symbol to the $(n+k-1)^{th}$ symbol. The first UE receives the second indication information from the network device on the $(n+1)^{th}$ symbol to the $(n+k-1)^{th}$ symbol, so that the first UE can further determine whether a resource that is in the first uplink resource and that corresponds to the $(n+k)^{th}$ symbol to the last symbol in the fifth uplink resource can be used by the first UE to send the uplink information.

In this embodiment of the present invention, the eMBB UE bypasses the RS in the GF resources configured for the URLLC UE, and the URLLC UE bypasses the resource in the GAP time after the RS in the GF resources configured for the URLLC UE, so that the URLLC UE transmits, to the eMBB UE, information that the URLLC UE occupies another configured GF resource, to solve a problem that quality of service of a service degrades due to a conflict between a transmission resource of an eMBB uplink service and a transmission resource of a URLLC uplink service, and ensure utilization efficiency of the uplink resource. In addition, dynamic orthogonal multiplexing is implemented between the transmission resource of the eMBB uplink service and the transmission resource of the URLLC uplink service, to ensure resource utilization efficiency and transmission performance of each of the eMBB uplink service and the URLLC uplink service.

It should be noted that in the embodiments of the present invention, a dashed line in the accompanying drawings indicates that a corresponding step is an optional step.

Further, in the embodiments of the present invention, a processor may instruct a transmitter or a transceiver to perform sending. The processor may obtain information in a message after a receiver or the transceiver receives the message.

Figure 18:
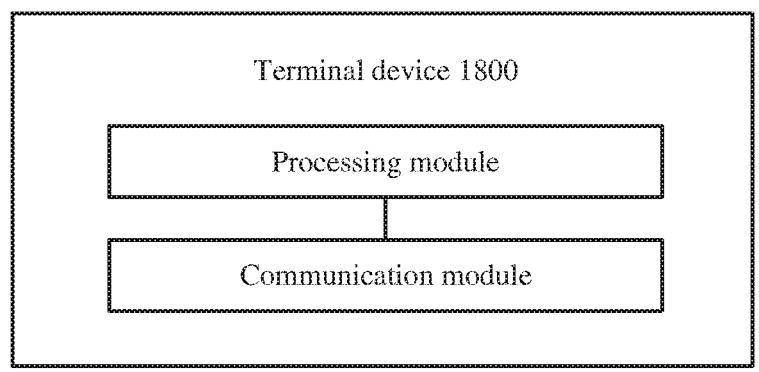
FIG. 18 is a schematic block diagram of a terminal device 1800 according to an embodiment of the present invention.

FIG. 18 is a schematic block diagram of a terminal device 1800 according to an embodiment of the present invention. Modules in the terminal device 1800 are separately configured to perform actions or processing processes performed by the first terminal device or the second terminal device in the foregoing method. Herein, for detailed descriptions, refer to the foregoing descriptions to avoid repetition.

The terminal device may include a communication module and a processing module.

The communication module is configured to receive first indication information sent by a network device, where the first indication information indicates a first uplink resource.

The communication module is further configured to send uplink information to the network device on a fourth uplink resource, where the fourth uplink resource is a resource other than a second uplink resource in the first uplink resource, the second uplink resource is a subset of a third uplink resource, and the third uplink resource is an intersection between a fifth uplink resource configured for a second terminal device and the first uplink resource.

Specifically, the processing module may obtain the first indication information from downlink control information, and instruct the communication module to send the uplink information.

Optionally, the second uplink resource includes a resource corresponding to a first time period.

In this case, in an optional implementation, the communication module is further configured to receive, in the first time period, second indication information sent by the network device, where the second indication information indicates that a resource after the first time period in the third uplink resource is unavailable, and the second uplink resource further includes the resource after the first time period in the third uplink resource.

Further, optionally, the communication module is further configured to receive, in the first time period, the second indication information sent by the network device, where the second indication information indicates that the resource after the first time period in the third uplink resource is available, and the fourth uplink resource includes the resource after the first time period in the third uplink resource.

In another optional implementation, the processing module is configured to perform, in the first time period, detection on a first signal sent by the second terminal device. If the first terminal device detects the first signal, the second uplink resource further includes a resource after the first time period in the third uplink resource; and/or if the first terminal device does not detect the first signal, the fourth uplink resource includes the resource after the first time period in the third uplink resource.

Alternatively, optionally, the fourth uplink resource includes a resource corresponding to a first time period in the third uplink resource.

The communication module is further configured to receive, in the first time period, second indication information sent by the network device, where the second indication information indicates that a resource after the first time period in the third uplink resource is unavailable, and the second uplink resource further includes the resource after the first time period in the third uplink resource.

Optionally, the communication module is further configured to receive, in the first time period, the second indication information sent by the network device, where the second indication information indicates that the resource after the first time period in the third uplink resource is available, and the fourth uplink resource further includes the resource after the first time period in the third uplink resource.

It should be noted that the processing module in this embodiment may be implemented by the processor 301 in FIG. 3, and the communication module in this embodiment may be implemented by the receiver 302 and the transmitter 303 in FIG. 3.

For technical effects that can be achieved in this embodiment, refer to the foregoing descriptions. For other details and a specific manner of performing an action by each module, also refer to the foregoing descriptions. The details are not described herein again.

Figure 19:
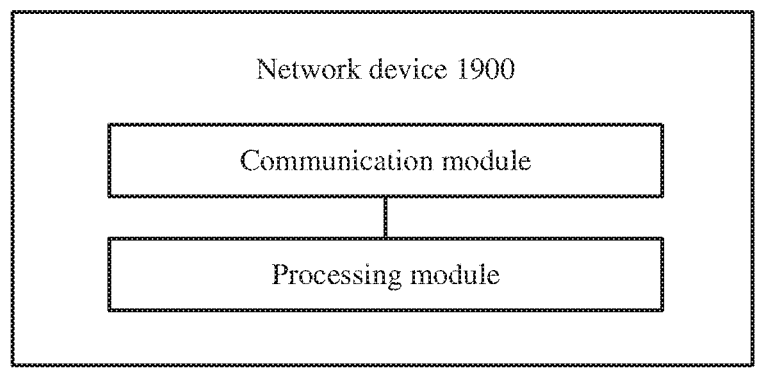
FIG. 19 is a schematic block diagram of a network device 1900 according to an embodiment of the present invention.

FIG. 19 is a schematic block diagram of a network device 1900 according to an embodiment of the present invention. Modules in the network device 1900 are separately configured to perform actions or processing processes performed by the network device in the foregoing method. Herein, for detailed descriptions, refer to the foregoing descriptions to avoid repetition.

When the terminal device 1800 shown in FIG. 18 is a second terminal device, the communication module is configured to receive, from the network device, configuration information indicating an uplink resource configured for the second terminal device, where the uplink resource includes a plurality of time domain symbols; the communication module is further configured to send a first signal on the first n time domain symbols in the plurality of time domain symbols; and the communication module is further configured to send uplink information on an $(n+k)^{th}$ symbol to a last symbol in the plurality of time domain symbols, where k is an integer greater than or equal to 1; the first signal is used to identify the second terminal device, or the first signal is used to perform channel estimation on the uplink information, or the first signal is used to indicate uplink sending timing adjustment of the second terminal device, or the first signal is used to instruct the second terminal device to occupy the uplink resource, or the first signal is used to indicate uplink sending timing adjustment of the second terminal device, or the first signal is used to instruct the second terminal device to send control information of the uplink information; and the control information includes at least one of a modulation and coding scheme, a hybrid automatic repeat request HARQ process number, a redundancy version (RV), or a new data indicator (NDI).

In this embodiment, if a first terminal device needs to send uplink information, the second terminal device sends the first signal on the first n symbols in the configured fifth uplink resource, so that the network device and/or the first terminal device can identify that the second terminal device needs to send the uplink information on the fifth uplink resource, to avoid a collision between the uplink information sent by the second terminal device and the uplink information sent by the first terminal device.

Further, when k is greater than 1, the second terminal device does not send the uplink information on an $(n+1)^{th}$ symbol to an $(n+k)^{th}$ symbol in the configured fifth uplink resource. In this case, the first terminal device can send the uplink information on a resource that is in a first uplink resource and that corresponds to the $(n+1)^{th}$ symbol to the $(n+k)^{th}$ symbol.

It should be noted that the processing module in this embodiment may be implemented by the processor 301 in FIG. 3, and the communication module in this embodiment may be implemented by the receiver 302 and the transmitter 303 in FIG. 3.

For technical effects that can be achieved in this embodiment, refer to the foregoing descriptions. For other details and a specific manner of performing an action by each module, also refer to the foregoing descriptions. The details are not described herein again.

FIG. 19 is a schematic block diagram of a network device 1900 according to an embodiment of the present invention. Modules in the network device 1900 are separately configured to perform actions or processing processes performed by the network device in the foregoing method. Herein, for detailed descriptions, refer to the foregoing descriptions to avoid repetition.

The network device may include a communication module and a processing module.

The communication module is configured to send first indication information to a first terminal device, where the first indication information indicates a first uplink resource.

The communication module is further configured to receive, on a fourth uplink resource, uplink information sent by the first terminal device, where the fourth uplink resource is a resource other than a second uplink resource in the first uplink resource, the second uplink resource is a subset of a third uplink resource, and the third uplink resource is an intersection between a fifth uplink resource configured for a second terminal device and the first uplink resource.

In an optional embodiment, the second uplink resource includes a resource corresponding to a first time period.

In this case, the communication module may be further configured to send, in the first time period, second indication information to the first terminal device, where the second indication information indicates that a resource after the first time period in the third uplink resource is unavailable, and the second uplink resource further includes the resource after the first time period in the third uplink resource.

Optionally, the communication module is further configured to send, in the first time period, the second indication information to the first terminal device, where the second indication information indicates that the resource after the first time period in the third uplink resource is available, and the fourth uplink resource includes the resource after the first time period in the third uplink resource.

In another optional embodiment, the fourth uplink resource includes a resource corresponding to a first time period in the third uplink resource.

In this case, the communication module is further configured to send, in the first time period, second indication information to the first terminal device, where the second indication information indicates that a resource after the first time period in the third uplink resource is unavailable, and the second uplink resource further includes the resource after the first time period in the third uplink resource.

Optionally, the communication module is further configured to send, in the first time period, the second indication information to the first terminal device, where the second indication information indicates that the resource after the first time period in the third uplink resource is available, and the fourth uplink resource further includes the resource after the first time period in the third uplink resource.

Optionally, the processing module is configured to: detect a first signal sent by the second terminal device, where the first signal is used to identify the second terminal device; and determine, based on the detected first signal, that the second terminal device sends uplink data on the fifth uplink resource.

The communication module is further configured to send configuration information to the first terminal device, where the configuration information is used to indicate the fifth uplink resource.

For technical effects that can be achieved in this embodiment, refer to the foregoing descriptions. Details are not described herein again.

It should be noted that the processing module in this embodiment may be implemented by the processor 201 in FIG. 2, and the communication module in this embodiment may be implemented by the receiver 202 and the transmitter 203 in FIG. 2.

For technical effects that can be achieved in this embodiment, refer to the foregoing descriptions. For other details and a specific manner of performing an action by each module, also refer to the foregoing descriptions. The details are not described herein again.

It should be noted that the foregoing method embodiments may be applied to a processor or implemented by the processor. The processor may be an integrated circuit chip and has a signal processing capability. In an implementation process, the steps in the foregoing method embodiments may be implemented by using a hardware integrated logical circuit in the processor or instructions in a form of software. The processor may be a general purpose processor, a digital signal processor (DSP), an application-specific integrated circuit (ASIC), a field programmable gate array (FPGA) or another programmable logical device, a discrete gate or a transistor logic device, or a discrete hardware component. The processor may implement or perform the methods, the steps, and logical block diagrams that are disclosed in the embodiments of the present invention. The general purpose processor may be a microprocessor, or the processor may be any conventional processor or the like. Steps in the methods disclosed with reference to the embodiments of the present invention may be directly performed and completed by using a hardware decoding processor, or may be performed and completed by using a combination of hardware and software modules in the decoding processor. A software module may be located in a mature storage medium in the art, for example, a random access memory, a flash memory, a read-only memory, a programmable read-only memory, an electrically erasable programmable memory, or a register. The storage medium is located in a memory, and the processor reads information from the memory and completes the steps in the foregoing methods in combination with hardware of the processor.

All or some of the embodiments may be implemented by using software, hardware, firmware, or any combination thereof. When being implemented by using software, all or some of the embodiments may be implemented in a form of a computer program product. The computer program product includes one or more computer program instructions. When the computer program instructions are loaded and executed on a computer, all or some of the procedures or functions according to the embodiments of the present invention are generated. The computer may be a general-purpose computer, a dedicated computer, a computer network, or another programmable apparatus. The computer program instructions may be stored in a computer readable storage medium or may be transmitted from a computer readable storage medium to another computer readable storage medium. For example, the computer program instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like. It should be understood that sequence numbers of the foregoing processes do not mean execution sequences in various embodiments of the present invention. The execution sequences of the processes should be determined based on functions and internal logic of the processes, and should not be construed as any limitation on the implementation processes in the embodiments of the present invention.

A person of ordinary skill in the art may be aware that units and algorithm steps in the examples described with reference to the embodiments disclosed in this specification can be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of the embodiments of the present invention.

It may be clearly understood by a person skilled in the art that for the purpose of convenient and brief description, for a detailed working process of the foregoing described system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, the unit division is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate components may or may not be physically separate, and components displayed as units may or may not be physical units, and may be located in one position, or may be distributed on a plurality of network units. Some or all of the units may be selected based on an actual requirement to achieve the objectives of the solutions of the embodiments.

In addition, function units in the embodiments of the present invention may be integrated into one processing unit, or each of the units may exist alone physically, or two or more units may be integrated into one unit.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, and/or a computer. As shown in figures, both an application that runs on a computing device and the computing device may be components. One or more components may reside within a process and/or a thread of execution, and a component may be located on one computer and/or distributed between two or more computers. In addition, these components may be executed from various computer readable media that store various data structures. For example, the components may communicate by using a local and/or remote process based on a signal having one or more data packets (for example, data from two components interacting with another component in a local system, a distributed system, and/or across a network such as the Internet interacting with another system by using the signal).

When the functions are implemented in a form of a software function unit and sold or used as an independent product, the functions may be stored in a computer readable storage medium. Based on such an understanding, the technical solutions of the embodiments of the present invention essentially, or the part contributing to the current system, or some of the technical solutions may be implemented in a form of a software product. The computer software product is stored in a storage medium, and includes several instructions for instructing a computer device (which may be a personal computer, a server, or a network device) to perform all or some of the steps of the methods in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations in the embodiments the present invention, but are not intended to limit the protection scope of the embodiments of the present invention. Any variation or replacement readily figured out by a person skilled in the art within the technical scope disclosed in the embodiments of the present invention shall fall within the protection scope of the embodiments of the present invention.

What is claimed is:

1. A method, comprising:
receiving, by a first terminal device, first indication information from a network device, wherein the first indication information indicates a first uplink resource scheduled for the first terminal device;
determining, by the first terminal device in a first time period, whether a second resource in a third uplink resource is available; and
sending, by the first terminal device, uplink information to the network device on a fourth uplink resource, wherein the fourth uplink resource is a resource in the first uplink resource other than a second uplink resource, the second uplink resource is a subset of the third uplink resource, the third uplink resource is an intersection between a fifth uplink resource and the first uplink resource, the fifth uplink resource is scheduled for a second terminal device, the second uplink resource comprises a first resource corresponding to the first time period, the second resource in the third uplink resource is after the first time period, and the second resource in the third uplink resource is comprised in the second uplink resource or the fourth uplink resource.

2. The method according to claim 1, wherein determining, by the first terminal device in the first time period, whether the second resource in the third uplink resource is available comprises:
receiving, in the first time period, second indication information from the network device, wherein the second indication information indicates that the second resource in the third uplink resource is unavailable, and the second uplink resource further comprises the second resource.

3. The method according to claim 1, wherein determining, by the first terminal device in the first time period, whether the second resource in the third uplink resource is available comprises:
receiving, in the first time period, second indication information from the network device, wherein the second indication information indicates that the second resource in the third uplink resource is available, and the fourth uplink resource comprises the second resource.

4. The method according to claim 1, wherein determining, by the first terminal device in the first time period, whether the second resource in the third uplink resource is available comprises:
performing, in the first time period, detection on a first signal from the second terminal device, wherein:
when the first signal is detected, the second resource in the third uplink resource is unavailable and the second uplink resource further comprises the second resource in the third uplink resource; or
when the first signal is not detected, the second resource in the third uplink resource is available and the fourth uplink resource comprises the second resource after the first time period in the third uplink resource.

5. The method according to claim 1, wherein:
the second uplink resource comprises a third resource in the third uplink resource, and the second terminal device sends first signals on the third resource; or
the fifth uplink resource further comprises a fourth resource, the fourth resource is before the third uplink resource, and the second terminal device sends the first signals on the fourth resource.

6. The method according to claim 5, wherein:
the first signals identifies the second terminal device, and the first signals indicate the second terminal device sends uplink information on the fifth uplink resource.

7. A method, comprising:
sending, by a network device, first indication information to a first terminal device, wherein the first indication information indicates a first uplink resource scheduled for the first terminal device;

sending, in a first time period, second indication information to the first terminal device, wherein the second indication information indicates whether a second resource in a third uplink resource is available, and the second resource in the third uplink resource is after the first time period; and receiving, on a fourth uplink resource, uplink information from the first terminal device, wherein the fourth uplink resource is a resource in the first uplink resource other than a second uplink resource, the second uplink resource is a subset of the third uplink resource, the second uplink resource comprises a first resource corresponding to the first time period, the third uplink resource is an intersection between a fifth uplink resource and the first uplink resource, and the fifth uplink resource is scheduled for a second terminal device.

8. The method according to claim 7, wherein the second indication information indicates the second resource in the third uplink resource is unavailable, and the second uplink resource further comprises the second resource.

9. The method according to claim 7, wherein the second indication information indicates that the second resource in the third uplink resource is available, and the fourth uplink resource comprises the second resource.

10. An apparatus, comprising:
at least one processor; and
a non-transitory computer-readable storage medium coupled to the at least one processor and storing programming instructions for execution by the at least one processor, wherein the programming instructions instruct the at least one processor to:
receive first indication information from a network device, wherein the first indication information indicates a first uplink resource scheduled for the apparatus;

determine, in a first time period, whether a second resource in a third uplink resource is available; and send uplink information to the network device on a fourth uplink resource, wherein the fourth uplink resource is a resource in the first uplink resource other than a second uplink resource, the second uplink resource is a subset of the third uplink resource, the third uplink resource is an intersection between a fifth uplink resource and the first uplink resource, the fifth uplink resource is scheduled for a second terminal device, the second uplink resource comprises a first resource corresponding to the first time period, the second resource in the third uplink resource is after the first time period, and the second resource in the third uplink resource is comprised in the second uplink resource or the fourth uplink resource.

11. The apparatus according to claim 10, wherein the programming instructions further instruct the at least one processor to:
receive, in the first time period, second indication information from the network device, wherein the second indication information indicates that the second resource in the third uplink resource is unavailable, and the second uplink resource further comprises the second resource.

12. The apparatus according to claim 10, wherein the programming instructions instruct the at least one processor to:
receive, in the first time period, second indication information from the network device, wherein the second indication information indicates that the second resource in the third uplink resource is available, and the fourth uplink resource comprises the second resource.

* * * * *

UNITED STATES PATENT AND TRADEMARK OFFICE
CERTIFICATE OF CORRECTION

| | |
|---|---|
| PATENT NO. | : 11,363,575 B2 |
| APPLICATION NO. | : 16/599287 |
| DATED | : June 14, 2022 |
| INVENTOR(S) | : Zhiyu Yan |

It is certified that error appears in the above-identified patent and that said Letters Patent is hereby corrected as shown below:

In the Claims

Claim 11, Column 38, Line 20; delete "further".

Signed and Sealed this
Second Day of August, 2022

Katherine Kelly Vidal
*Director of the United States Patent and Trademark Office*